US011941762B2

(12) United States Patent
Sonasath et al.

(10) Patent No.: US 11,941,762 B2
(45) Date of Patent: Mar. 26, 2024

(54) SYSTEM AND METHOD FOR AUGMENTED REALITY SCENES

(71) Applicant: Samsung Electronics Co., Ltd., Suwon-si (KR)

(72) Inventors: Moiz Kaizar Sonasath, Sunnyvale, CA (US); Andrew Lawrence Deng, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/680,303

(22) Filed: Nov. 11, 2019

(65) Prior Publication Data

US 2021/0019946 A1    Jan. 21, 2021

Related U.S. Application Data

(60) Provisional application No. 62/874,417, filed on Jul. 15, 2019.

(51) Int. Cl.
  *G06T 19/00*  (2011.01)
  *G06F 3/041*  (2006.01)
  (Continued)

(52) U.S. Cl.
  CPC ............ *G06T 19/006* (2013.01); *G06F 3/041* (2013.01); *G06F 3/0482* (2013.01);
  (Continued)

(58) Field of Classification Search
  CPC ....... G06T 19/006; G06T 7/33; G06T 3/4038; G06F 3/0488; G06F 3/041; G06F 3/048
  See application file for complete search history.

(56) References Cited

U.S. PATENT DOCUMENTS 10,559,121 B1 *   2/2020  Moudgil ................. G06T 15/50
10,692,297 B2    6/2020  Puan et al.
(Continued)

FOREIGN PATENT DOCUMENTS

KR     101902131 B1    9/2018
WO    2015192117 A1   12/2015
(Continued)

OTHER PUBLICATIONS

Notification of Transmittal of the International Search Report and the Written Opinion of the International Searching Authority, or the Declaration dated Oct. 15, 2020 in connection with International Patent Application No. PCT/KR2020/009041, 10 pages.

*Primary Examiner* — Nelson M Rosario
*Assistant Examiner* — Scott D Au

(57) ABSTRACT

An electronic device includes an image sensor, a touchscreen display, a transceiver, a processor, and a memory coupled to the processor. The memory stores instructions executable by the processor to receive images of a real world environment via the image sensor; receive, via the touchscreen display, an input for a location of at least one augmented reality anchor point on the received images of the real world environment; receive a selection of at least one virtual object associated with the at least one augmented reality anchor point; output to the touchscreen display the at least one virtual object in proximity to the at least one augmented reality anchor point; generate an augmented reality scene based in part on the at least one augmented reality anchor point and the at least one virtual object; and transmit the augmented reality scene to a receiving device via the transceiver.

20 Claims, 21 Drawing Sheets

(51) Int. Cl.
  *G06F 3/0482* (2013.01)
  *G06F 3/04845* (2022.01)
  *G06F 3/0488* (2022.01)
  *G06T 3/4038* (2024.01)
  *G06T 7/33* (2017.01)

(52) U.S. Cl.
  CPC ........ *G06F 3/04845* (2013.01); *G06F 3/0488* (2013.01); *G06T 3/4038* (2013.01); *G06T 7/33* (2017.01); *G06T 2200/24* (2013.01); *G06T 2207/10028* (2013.01); *G06T 2207/20101* (2013.01)

(56) References Cited

U.S. PATENT DOCUMENTS

| | | | |
|---|---|---|---|
| 10,777,010 B1* | 9/2020 | Patel | G06T 15/04 |
| 10,937,240 B2 | 3/2021 | Anderson | |
| 2012/0122491 A1 | 5/2012 | Kim et al. | |
| 2013/0222369 A1 | 8/2013 | Huston et al. | |
| 2015/0206349 A1 | 7/2015 | Rosenthal et al. | |
| 2017/0287218 A1 | 10/2017 | Nuernberger et al. | |
| 2018/0261011 A1 | 9/2018 | Kollencheri Puthenveettil | |
| 2018/0350145 A1* | 12/2018 | Byl | G06T 19/006 |
| 2019/0065027 A1 | 2/2019 | Hauenstein et al. | |
| 2019/0088030 A1* | 3/2019 | Masterson | G01S 19/01 |
| 2019/0139317 A1 | 5/2019 | Bilbrey et al. | |
| 2019/0325604 A1* | 10/2019 | Fink | G06T 17/00 |
| 2020/0258144 A1* | 8/2020 | Chaturvedi | G06T 7/13 |
| 2021/0272373 A1* | 9/2021 | Fradet | G06T 19/006 |

FOREIGN PATENT DOCUMENTS

| | | |
|---|---|---|
| WO | 2018011703 A1 | 1/2018 |
| WO | 2019055703 A2 | 3/2019 |

\* cited by examiner

SYSTEM AND METHOD FOR AUGMENTED REALITY SCENES

CROSS-REFERENCE TO RELATED APPLICATION AND PRIORITY CLAIM

This application claims priority under 35 U.S.C. § 119(e) to U.S. Provisional Patent Application No. 62/874,417 filed on Jul. 15, 2019, which is hereby incorporated by reference in its entirety.

TECHNICAL FIELD

This disclosure relates generally to augmented reality. More specifically, this disclosure relates to a system and method for augmented reality scenes.

BACKGROUND

Virtual reality (VR), augmented reality (AR), and mixed reality (MR) technologies are becoming more and more common as the availability of VR, AR, and MR headsets and other devices continues to expand. Virtual reality generally refers to technology that creates an artificial simulation or recreation of an environment, which may or may not be a real-world environment. Augmented reality generally refers to technology in which computer-generated content is superimposed over a real-world environment. Mixed reality generally refers to technology in which computer-generated content is superimposed over or replaces a real-world environment, where computer-generated objects are anchored to or interact with physical objects in the real-world environment.

In existing situations for AR scenes, an augmented reality scene is realized when a device is used to overlay a scene rendered using computer-generated graphics onto a real world scene into a single combined scene. In these scenes, the virtual scene is matched to features of the real scene to give the illusion that the virtual objects are actually present in the real world. In most AR applications, specialized controllers are used to track a user's input to allow the user to interact with the virtual objects. This can be rather cumbersome, however, as the user is restricted from interacting with the real world normally while using the device. Additionally, for the scene to be reconstructed on another device, current implementations require a host device to store features of the scene to a server tagged with a unique string identifier (ID). For another device to reconstruct the same scene, the device must receive the ID and use the ID to request the stored feature data from the server to reconstruct the scene. This either requires the ID to be hard coded into the software or multiple requests to a server, which can impede reconstruction flexibility or speed.

SUMMARY

This disclosure provides a system and method for augmented reality scenes.

In a first embodiment, an electronic device includes an image sensor; a touchscreen display; a transceiver; a processor coupled to the image sensor, the touchscreen display, and the transceiver; and a memory coupled to the processor. The memory stores instructions executable by the processor to receive images of a real world environment via the image sensor; receive, via the touchscreen display, an input for a location of at least one augmented reality anchor point on the received images of the real world environment; receive a selection of at least one virtual object associated with the at least one augmented reality anchor point; output to the touchscreen display the at least one virtual object in proximity to the at least one augmented reality anchor point; generate an augmented reality scene based in part on the at least one augmented reality anchor point and the at least one virtual object; and transmit the augmented reality scene to a receiving device via the transceiver.

In a second embodiment, a method includes receiving, from an image sensor, images of a real world environment. The method also includes receiving, from a touchscreen display, an input for a location of at least one augmented reality anchor point on the received images of the real world environment. The method also includes receiving a selection of at least one virtual object associated with the at least one augmented reality anchor point. The method also includes displaying, at the touchscreen display, the at least one virtual object in proximity to the at least one augmented reality anchor point. The method also includes generating an augmented reality scene based in part on the at least one augmented reality anchor point and the at least one virtual object. The method also includes transmitting the augmented reality scene to a receiving device.

In a third embodiment, an electronic device includes a transceiver; a processor coupled to the transceiver; and a memory coupled to the processor. The memory stores instructions executable by the processor to store an augmented reality scene received from a first device, the first augmented reality scene comprising at least one virtual object and at least one physical object of a real world environment; receive, via the transceiver, a first request from a second device to send the first augmented reality scene to the second device, the first augmented reality scene having a first point cloud; transmit, via the transceiver, the first augmented reality scene to the second device for showing the first augmented reality scene on a display of the second device; receive, via the transceiver, a second request from the second device to send a second augmented reality scene to the second device, the second augmented reality scene having a second point cloud that overlaps the first point cloud; stitch together the first augmented reality scene and the second augmented reality scene into a global scene based on the overlapping first point cloud and second point cloud; and transmit the second augmented reality scene to the second device for showing the global scene on the display of the second device.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B.

As used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic appcessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such SAMSUNG HOMESYNC, APPLETV, or GOOGLE TV), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
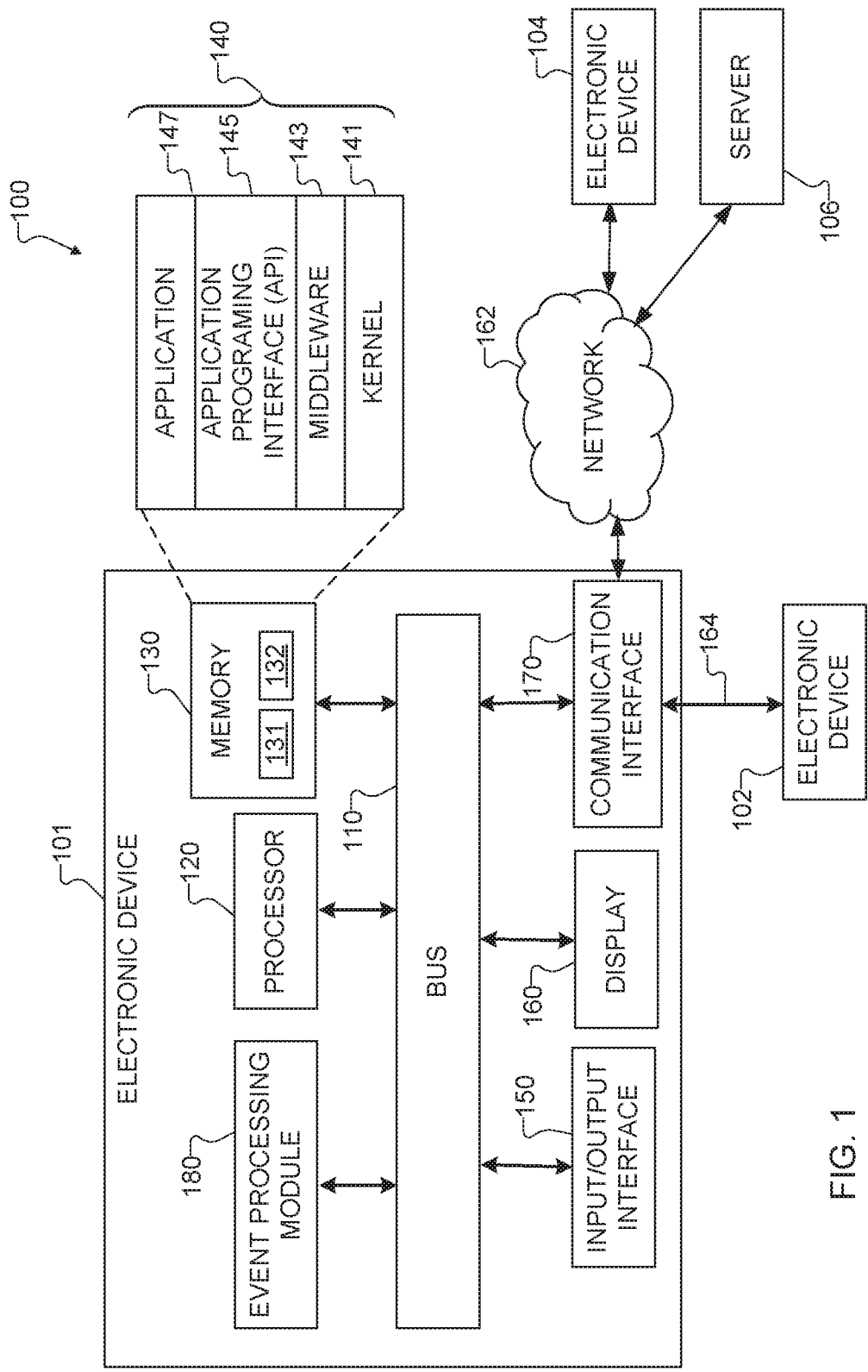
FIG. 1 illustrates an example network configuration in accordance with this disclosure.

The figures discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference numerals may be used to refer to the same or similar elements throughout the specification and the drawings.

As noted above, in most AR applications, specialized controllers are used to track a user's input to allow the user to interact with the virtual objects. This can be rather cumbersome, however, as the user is restricted from interacting with the real world normally while using the device. Additionally, for the scene to be reconstructed on another device, current implementations require a host device to store features of the scene to a server tagged with a unique string identifier (ID). For another device to reconstruct the same scene, it must be sent the ID somehow and use the ID to request the stored feature data from the server to reconstruct the scene. This either requires the ID to be hard coded into the software or multiple requests to a server, which can impede reconstruction flexibility or speed.

To address these and other issues, this disclosure provides techniques for generating, customizing, and viewing augmented reality scenes. In some embodiments, an augmented reality scene customization system may allow a user to create an augmented reality scene, customize it via gesture inputs, and save it to a server in a format that removes the need for a unique ID. Creation of the augmented scene can involve capturing a real world scene using a camera and overlaying the virtual scene onto the real world scene. Customization of the scene can include placing virtual objects into the scene, deleting specific objects from the scene, and editing characteristics of objects already placed into the scene (including the object's position, orientation, scale, and data content). It can also include the capability to intelligently set an object's initial position in the scene to facilitate intuitive user interaction. Saving the scene can involve recording both the relation of the virtual scene to the real world scene and the positioning of data objects within the virtual scene. It can also include images from different perspectives of the real world scene, along with global positioning data and other metrics to assist in intuitive scene reconstruction.

FIG. 1 illustrates an example network configuration 100 in accordance with this disclosure. As shown in FIG. 1, according to embodiments of this disclosure, an electronic device 101 is included in the network configuration 100. The electronic device 101 may include at least one of a bus 110, a processor 120, a memory 130, an input/output (I/O) interface 150, a display 160, a communication interface 170, or an event processing module 180. In some embodiments, the electronic device 101 may exclude at least one of the components or may add another component.

The bus 110 may include a circuit for connecting the components 120-180 with one another and transferring communications (such as control messages and/or data) between the components. The processor 120 may include one or more of a central processing unit (CPU), an application processor (AP), or a communication processor (CP). The processor 120 may perform control on at least one of the other components of the electronic device 101 and/or perform an operation or data processing relating to communication.

The memory 130 may include a volatile and/or non-volatile memory. For example, the memory 130 may store commands or data related to at least one other component of the electronic device 101. According to embodiments of this disclosure, the memory 130 may store software and/or a program 140. The program 140 may include, for example, a kernel 141, middleware 143, an application programming interface (API) 145, and/or an application program (or "application") 147. At least a portion of the kernel 141, middleware 143, or API 145 may be denoted an operating system (OS).

The kernel 141 may control or manage system resources (such as the bus 110, processor 120, or memory 130) used to perform operations or functions implemented in other programs (such as the middleware 143, API 145, or application program 147). The kernel 141 may provide an interface that allows the middleware 143, API 145, or application 147 to access the individual components of the electronic device 101 to control or manage the system resources. The middleware 143 may function as a relay to allow the API 145 or the application 147 to communicate data with the kernel 141, for example. A plurality of applications 147 may be provided. The middleware 143 may control work requests received from the applications 147, such as by allocating the priority of using the system resources of the electronic device 101 (such as the bus 110, processor 120, or memory 130) to at least one of the plurality of applications 147. The API 145 is an interface allowing the application 147 to control functions provided from the kernel 141 or the middleware 143. For example, the API 145 may include at least one interface or function (such as a command) for file control, window control, image processing, or text control.

The input/output interface 150 may serve as an interface that may, for example, transfer commands or data input from a user or other external devices to other component(s) of the electronic device 101. Further, the input/output interface 150 may output commands or data received from other component(s) of the electronic device 101 to the user or the other external devices.

The display 160 may include, for example, a liquid crystal display (LCD), a light emitting diode (LED) display, an organic light emitting diode (OLED) display, a quantum light emitting diode (QLED) display, a microelectromechanical systems (MEMS) display, or an electronic paper display. The display 160 can also be a depth-aware display, such as a multi-focal display. The display 160 may display various contents (such as text, images, videos, icons, or symbols) to the user. The display 160 may include a touchscreen and may receive, for example, a touch, gesture, proximity, or hovering input using an electronic pen or a body portion of the user.

The communication interface 170 may set up communication between the electronic device 101 and an external electronic device (such as a first electronic device 102, a second electronic device 104, or a server 106). For example, the communication interface 170 may be connected with a network 162 or 164 through wireless or wired communication to communicate with the external electronic device.

The first external electronic device 102 or the second external electronic device 104 may be a wearable device or an electronic device 101-mountable wearable device (such as a head mounted display (HMD)). When the electronic device 101 is mounted in an HMD (such as the electronic device 102), the electronic device 101 may detect the mounting in the HMD and operate in a virtual reality mode. When the electronic device 101 is mounted in the electronic device 102 (such as the HMD), the electronic device 101 may communicate with the electronic device 102 through the communication interface 170. The electronic device 101 may be directly connected with the electronic device 102 to communicate with the electronic device 102 without involving a separate network.

The wireless communication may use at least one of, for example, long term evolution (LTE), long term evolution-advanced (LTE-A), code division multiple access (CDMA), wideband code division multiple access (WCDMA), universal mobile telecommunication system (UMTS), wireless broadband (WiBro), or global system for mobile communication (GSM), as a cellular communication protocol. The wired connection may include at least one of, for example, universal serial bus (USB), high definition multimedia interface (HDMI), recommended standard 232 (RS-232), or plain old telephone service (POTS). The network 162 may include at least one communication network, such as a computer network (like a local area network (LAN) or wide area network (WAN)), the Internet, or a telephone network.

The first and second external electronic devices 102 and 104 each may be a device of the same type or a different type from the electronic device 101. According to embodiments of this disclosure, the server 106 may include a group of one or more servers. Also, according to embodiments of this disclosure, all or some of the operations executed on the electronic device 101 may be executed on another or multiple other electronic devices (such as the electronic devices 102 and 104 or server 106). Further, according to embodiments of this disclosure, when the electronic device 101 should perform some function or service automatically or at a request, the electronic device 101, instead of executing the function or service on its own or additionally, may request another device (such as electronic devices 102 and 104 or server 106) to perform at least some functions associated therewith. The other electronic device (such as electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

While FIG. 1 shows that the electronic device 101 includes the communication interface 170 to communicate with the external electronic device 102 or 104 or server 106 via the network(s) 162 and 164, the electronic device 101 may be independently operated without a separate communication function, according to embodiments of this disclosure. Also, note that the electronic device 102 or 104 or the server 106 could be implemented using a bus, a processor, a memory, an I/O interface, a display, a communication interface, and an event processing module (or any suitable subset thereof) in the same or similar manner as shown for the electronic device 101.

The server 106 may operate to drive the electronic device 101 by performing at least one of the operations (or functions) implemented on the electronic device 101. For example, the server 106 may include an event processing server module (not shown) that may support the event processing module 180 implemented in the electronic device 101. The event processing server module may include at least one of the components of the event processing module 180 and perform (or instead perform) at least one of the operations (or functions) conducted by the event processing module 180. The event processing module 180 may process at least part of the information obtained from other elements (such as the processor 120, memory 130, input/output interface 150, or communication interface 170) and may provide the same to the user in various manners.

While the event processing module 180 is shown to be a module separate from the processor 120 in FIG. 1, at least a portion of the event processing module 180 may be included or implemented in the processor 120 or at least one other module, or the overall function of the event processing module 180 may be included or implemented in the processor 120 shown or another processor. The event processing module 180 may perform operations according to embodiments of this disclosure in interoperation with at least one program 140 stored in the memory 130.

As described in more detail below, one or more devices of the network configuration 100 (such as the electronic device 101, 102, 104 or server 106) comprise a system for generating and customizing an augmented reality scene. In some embodiments, the augmented reality scene can be generated with real world objects and virtual objects, with relationships defined between the two. The system enables a user using a touchscreen device to intuitively place objects containing various types of data into the augmented reality scene and manipulate them in the scene using only gesture inputs. Depending on the device, gestures may include taps on a touchscreen, hand motions captured by a camera, or any other form of user input captured by the device. In generating the scene, virtual objects can be customized and repositioned, and additional real world data including image captures from various perspectives, global positioning data, and network metadata, can be included. Once the user is finished manipulating the objects, the relative positioning of all the objects in the virtual scene along with data about the real scene may be saved. Other positional data such as image captures from different perspectives and global positioning data (from a GPS) can be saved to aid in scene reconstruction.

The recorded data of the augmented reality scene can be stored on a remote server, such as the server 106. At a later time, a second user may be able to reconstruct the scene just by initializing a scene capture at the same location. The global position of the second user may be used to find stored AR scenes on the server that match the second user's location. This can be augmented by network connectivity metadata to further narrow down the set of scenes that could be reconstructed. In some embodiments, point cloud data and keyframe data can be matched to the few potential scenes left using a point set registration algorithm, and the best match may be concluded as the right scene. Comparisons may be done in parallel in the cloud to improve performance. The recorded data objects may then be placed into the resolved scene in the same positions as they were in the original user's customized scene.

Although FIG. 1 illustrates one example of a network configuration 100, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
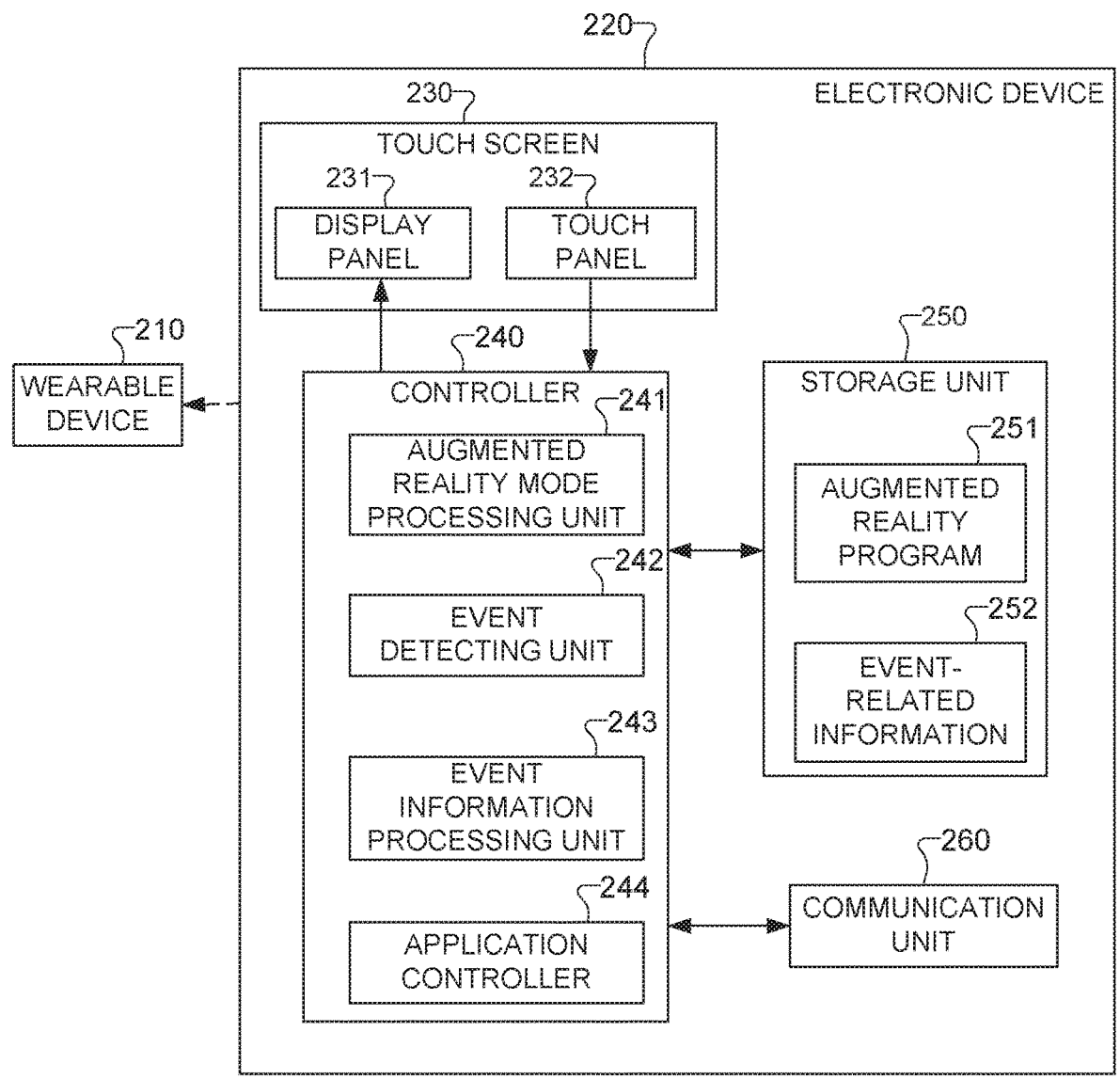
FIG. 2 illustrates an example configuration of an electronic device in accordance with this disclosure.

FIG. 2 illustrates an example configuration of an electronic device 220 in accordance with this disclosure. The electronic device 220 shown in FIG. 2 could, for example, be used as any of the electronic devices 101, 102, 104 shown in FIG. 1 and described above. However, the electronic devices 101, 102, 104 shown in FIG. 1 could be implemented in any other suitable manner. In the following description, the electronic device 220 could be a device primarily performing a display function or could denote a normal electronic device including at least one display. For example, the electronic device 220 could be an electronic device (such as a smartphone or smart watch) having a display.

As shown in FIG. 2, according to embodiments of this disclosure, the electronic device 220 can include at least one of a touchscreen 230, a controller 240, a storage unit 250, or a communication unit 260. The touchscreen 230 can include a display panel 231 and/or a touch panel 232. The controller 240 can include at least one of an augmented reality mode processing unit 241, an event detecting unit 242, an event information processing unit 243, or an application controller 244.

In some embodiments, when the electronic device 220 is mounted in a wearable device 210, the electronic device 220 can operate, for example, as an HMD and run an augmented reality mode. Further, according to embodiments of this disclosure, even when the electronic device 220 is not mounted in the wearable device 210, the electronic device 220 can run the augmented reality mode according to the user's settings or run an augmented reality mode-related application. In the following discussion, although the electronic device 220 is set to be mounted in the wearable device 210 to run the augmented reality mode, embodiments of this disclosure are not limited to this specific implementation.

According to some embodiments, when the electronic device 220 operates in the augmented reality mode (such as when the electronic device 220 is mounted in the wearable device 210 to operate in a head mounted theater (HMT) mode), two screens corresponding to the user's eyes (left eye and right eye) can be displayed through the display panel 231. Also, according to some embodiments, when the electronic device 220 is operated in the augmented reality mode, the controller 240 can control the processing of information related to an event generated while operating in the augmented reality mode to fit in the augmented reality mode and display the processed information. Further, according to some embodiments, when the event generated while operating in the augmented reality mode is an event related to running an application, the controller 240 can block the running of the application or process the application to operate as a background process or application.

As noted above, the controller 240 can include at least one of the augmented reality mode processing unit 241, the event detecting unit 242, the event information processing unit 243, or the application controller 244 to perform functions according to various embodiments of this disclosure. Embodiments of this disclosure can be implemented to perform various operations or functions as described below using at least one component of the electronic device 220, such as the touchscreen 230, controller 240, or storage unit 250.

According to some embodiments, when the electronic device 220 is mounted in the wearable device 210 or the augmented reality mode is run according to the user's setting or as an augmented reality mode-related application runs, the augmented reality mode processing unit 241 can process various functions related to the operation of the augmented reality mode. The augmented reality mode processing unit 241 can load at least one augmented reality program 251 stored in the storage unit 250 to perform various functions.

The event detecting unit 242 determines or detects that an event is generated while operated in the augmented reality mode by the augmented reality mode processing unit 241. Also, the event detecting unit 242 can determine whether there is information to be displayed on the display screen of the electronic device 220 (such as the touchscreen 230) in relation with an event generated while operating in the augmented reality mode. Further, the event detecting unit 242 can determine that an application is to be run in relation with an event generated while operating in the augmented reality mode. Various embodiments of an application related to the type of event are described below.

The event information processing unit 243 can process the event-related information to be displayed on the display screen to fit the augmented reality mode when there is information to be displayed in relation with an event occurring while operating in the augmented reality mode (depending on the result of the determination by the event detecting unit 242). Various methods for processing event-related information can apply. For example, when a three-dimensional (3D) image is implemented in the augmented reality mode, the electronic device 220 may convert the event-related information to fit the 3D image. As a particular example, event-related information being displayed in two dimensions (2D) can be converted into left and right eye information corresponding to the 3D image, and the converted information can be synthesized and displayed on the display screen of the augmented reality mode being currently run.

According to some embodiments, when it is determined by the event detecting unit 242 that there is an application to be run in relation with the event occurring while operating in the augmented reality mode, the application controller 244 may perform control to block the running of the application related to the event. Also, according to some embodiments, when it is determined by the event detecting unit 242 that there is an application to be run in relation with the event occurring while operating in the augmented reality mode, the application controller 244 may perform control so that the application is run in the background so as not to influence the running or screen display of the application corresponding to the augmented reality mode when the event-related application runs.

The storage unit 250 can store the augmented reality program 251. The augmented reality program 251 can be an application related to the augmented reality mode operation of the electronic device 220. The storage unit 250 can also store the event-related information 252. The event detecting unit 242 can reference the event-related information 252 stored in the storage unit 250 in order to determine whether the occurring event is to be displayed on the screen or to identify information on the application to be run in relation with the occurring event.

In some embodiments, the wearable device 210 can be an electronic device including at least one function of the electronic device 101 shown in FIG. 1, and the wearable device 210 can be a wearable stand to which the electronic device 220 can be mounted. In cases where the wearable device 210 is an electronic device, when the electronic device 220 is mounted on the wearable device 210, various functions can be provided through the communication unit 260 of the electronic device 220. For example, when the electronic device 220 is mounted on the wearable device 210, the electronic device 220 can detect whether it has been mounted on the wearable device 210 for communication with the wearable device 210 and can determine whether to operate in the augmented reality mode (or an HMT mode).

According to some embodiments, upon failure to automatically determine whether the electronic device 220 is mounted when the communication unit 260 is mounted on the wearable device 210, the user can run the augmented reality program 251 or select the augmented reality mode (or the HMT mode). Also, according to some embodiments, when the wearable device 210 functions with or as part of the electronic device 220, the wearable device 210 can be implemented to automatically determine whether the electronic device 220 is mounted on the wearable device 210 and enable the running mode of the electronic device 220 to automatically switch to the augmented reality mode (or the HMT mode).

At least some functions of the controller 240 shown in FIG. 2 can be included in the event processing module 180 or processor 120 of the electronic device 101 shown in FIG. 1. Also, the touchscreen 230 or display panel 231 shown in FIG. 2 can correspond to the display 160 of FIG. 1. Further, the storage unit 250 shown in FIG. 2 can correspond to the memory 130 of FIG. 1. While the touchscreen 230 in FIG. 2 includes the display panel 231 and the touch panel 232, according to other embodiments of this disclosure, the display panel 231 or the touch panel 232 may also be provided as a separate panel rather than being combined in a single touchscreen 230. Also, according to embodiments of this disclosure, the electronic device 220 can include the display panel 231 but exclude the touch panel 232.

According to some embodiments, the electronic device 220 can be denoted as a first device (or a first electronic device), and the wearable device 210 may be denoted as a second device (or a second electronic device) for ease of description. Also, according to some embodiments, the electronic device 220 can include a display unit (such as the touchscreen 230) that displays on a screen corresponding to an augmented reality mode. The electronic device 220 can also include a controller 240 performing control that detects an interrupt according to an occurrence of at least one event, varies event-related information related to the event in a form corresponding to the augmented reality mode, and displays the varied event-related information on the display screen that corresponds to the augmented reality mode. According to some embodiments, the event can include any one or more selected from among a call reception event, a message reception event, an alarm notification, a scheduler notification, a Wi-Fi connection, a Wi-Fi disconnection, a low battery notification, a data permission or use restriction notification, a no application response notification, or an abnormal application termination notification.

According to some embodiments, the electronic device 220 further includes a storage unit 250 configured for storing the event-related information when the event is not an event to be displayed in the augmented reality mode, where the controller 240 can perform control to display the event-related information stored in the storage unit 250 when the electronic device 220 switches from an augmented reality mode into a non-augmented reality mode. Also, according to some embodiments, the electronic device 220 can further include a storage unit 250 that stores information regarding at least one event to be displayed in the augmented reality mode. According to some embodiments, the event can include an instant message reception notification event.

According to some embodiments, when the event is an event related to running at least one application, the controller 240 can perform control that blocks running of the application according to occurrence of the event. According to some embodiments, the controller 240 can perform control to run the blocked application when a screen mode of the electronic device switches from an augmented reality mode into a non-augmented reality mode. According to some embodiments, when the event is an event related to running at least one application, the controller 240 can perform control that enables the application, according to the occurrence of the event, to be run on a background of a screen of the augmented reality mode. According to some embodiments, when the electronic device 220 is connected with a wearable device 210, the controller 240 can perform control to run the augmented reality mode. According to some embodiments, the controller 240 can enable the event-related information to be arranged and processed to be displayed in a 3D space of the augmented reality mode screen being displayed on a current display screen. According to some embodiments, the electronic device 220 can include additional sensors, such as one or more red, green, blue (RGB) cameras, dynamic vision sensor (DVS) cameras, 360 degree cameras, or a combination thereof.

Although FIG. 2 illustrates one example of a configuration of an electronic device 220, various changes may be made to FIG. 2. For example, computing and communication devices come in a wide variety of configurations, and FIG. 2 does not limit this disclosure to use with this one specific implementation of an electronic device 220.

Figure 3:
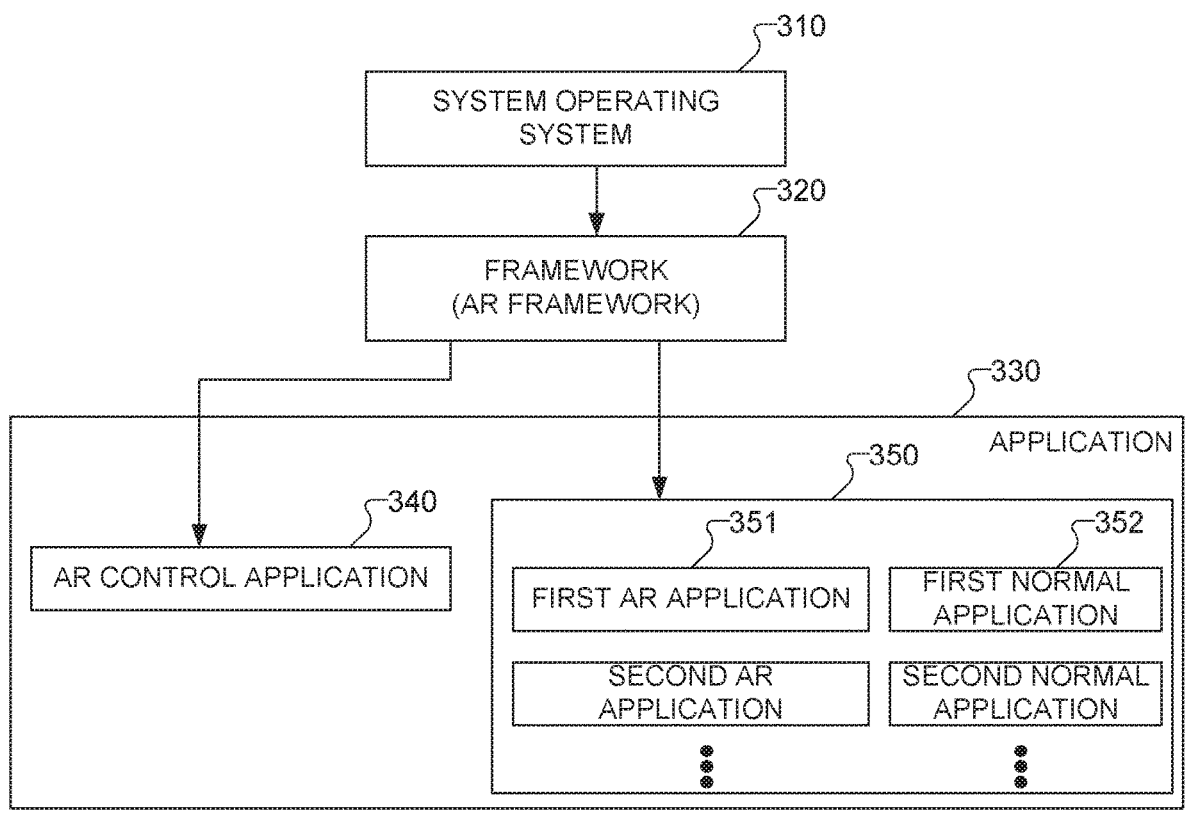
FIG. 3 illustrates an example program module in accordance with this disclosure.

FIG. 3 illustrates an example program module in accordance with this disclosure. The program module shown in FIG. 3 could, for example, be used in any of the electronic devices 101, 102, 104, 220 shown in FIGS. 1 and 2 and described above. However, the electronic devices 101, 102, 104, 220 shown in FIGS. 1 and 2 could be implemented in any other suitable manner.

As shown in FIG. 3, the program module in this example can include a system operating system (OS) 310, a framework 320, and at least one application 330. The system OS 310 can include at least one system resource manager or at least one device driver. The system resource manager can perform, for example, control, allocation, or recovery of system resources. The system resource manager may include at least one manager, such as a process manager, memory manager, or file system manager. The device driver may include at least one driver, such as, for example, a display driver, camera driver, BLUETOOTH driver, shared memory driver, USB driver, keypad driver, Wi-Fi driver, audio driver, or inter-process communication (IPC) driver.

According to some embodiments, the framework 320 (such as middleware) can provide, for example, functions commonly required by an application or provide the application with various functions through an API to allow the application to efficiently use limited system resources inside an electronic device. The AR framework included in the framework 320 can control functions related to augmented reality mode operations on the electronic device. For example, when running an augmented reality mode operation, the AR framework 320 can control at least one AR application 351, which is related to some form of augmented reality, among applications 330 so as to provide the augmented reality mode on the electronic device.

The application(s) 330 can include a plurality of applications and can include at least one AR application 351 running in the augmented reality mode and at least one normal application 352 running in a non-augmented reality mode. The application(s) 330 can further include an AR control application 340. An operation of the at least one AR application 351 and/or at least one normal application 352 can be controlled by the AR control application 340.

When at least one event occurs while the electronic device operates in the augmented reality mode, the system OS 310 can notify the framework 320, such as the AR framework, of an occurrence of an event. The framework 320 can then control the running of the normal application 352 so that event-related information can be displayed on the screen for the event occurring in the non-augmented reality mode but not in the augmented reality mode. When there is an application to be run in relation with the event occurring in the normal mode, the framework 320 can perform or provide control to run at least one normal application 352.

According to some embodiments, when an event occurs while operating in the augmented reality mode, the framework 320, such as the AR framework, can block the operation of at least one normal application 352 to display the information related to the occurring event. The framework 320 can provide the event occurring, while operating in the augmented reality mode, to the AR control application 340. The AR control application 340 can process the information related to the event occurring while operating in the augmented reality mode to fit within the operation of the augmented reality mode. For example, 2D planar event-related information can be processed into 3D information. The AR control application 340 can control at least one AR application 351 currently running and can perform control to synthesize the processed event-related information for display on the screen being run by the AR application 351 and display the result.

According to some embodiments, when an event occurs while operating in the augmented reality mode, the framework 320 can perform control to block the running of at least one normal application 352 related to the occurring event. Also, according to some embodiments, when an event occurs while operating in the augmented reality mode, the framework 320 can perform control to temporarily block the running of at least one normal application 352 related to the occurring event, and then (when the augmented reality mode terminates) the framework 320 can perform control to run the blocked normal application 352. Further, according to some embodiments, when an event occurs while operating in the augmented reality mode, the framework 320 can control the running of at least one normal application 352 related to the occurring event so that the at least one normal application 352 related to the event operates in the background so as not to influence the screen used by the AR application 351 currently running.

Although FIG. 3 illustrates one example of a program module that can be used in an electronic device, various changes may be made to FIG. 3. For example, the program module can include any suitable number of AR-related applications and any suitable number of non-AR-related applications. Also, embodiments described in connection with FIG. 3 are examples for implementing embodiments of this disclosure in the form of a program, and embodiments of this disclosure are not limited thereto and can be implemented in other various forms. Further, while the embodiments described in connection with FIG. 3 reference AR, such embodiments may also be applied to other scenarios such as virtual reality, mixed reality, etc. In such embodiments, the AR portions or components may be utilized to enable the virtual reality or mixed reality aspects. Collectively the various reality scenarios may be referred to herein as XR.

Figure 4A:
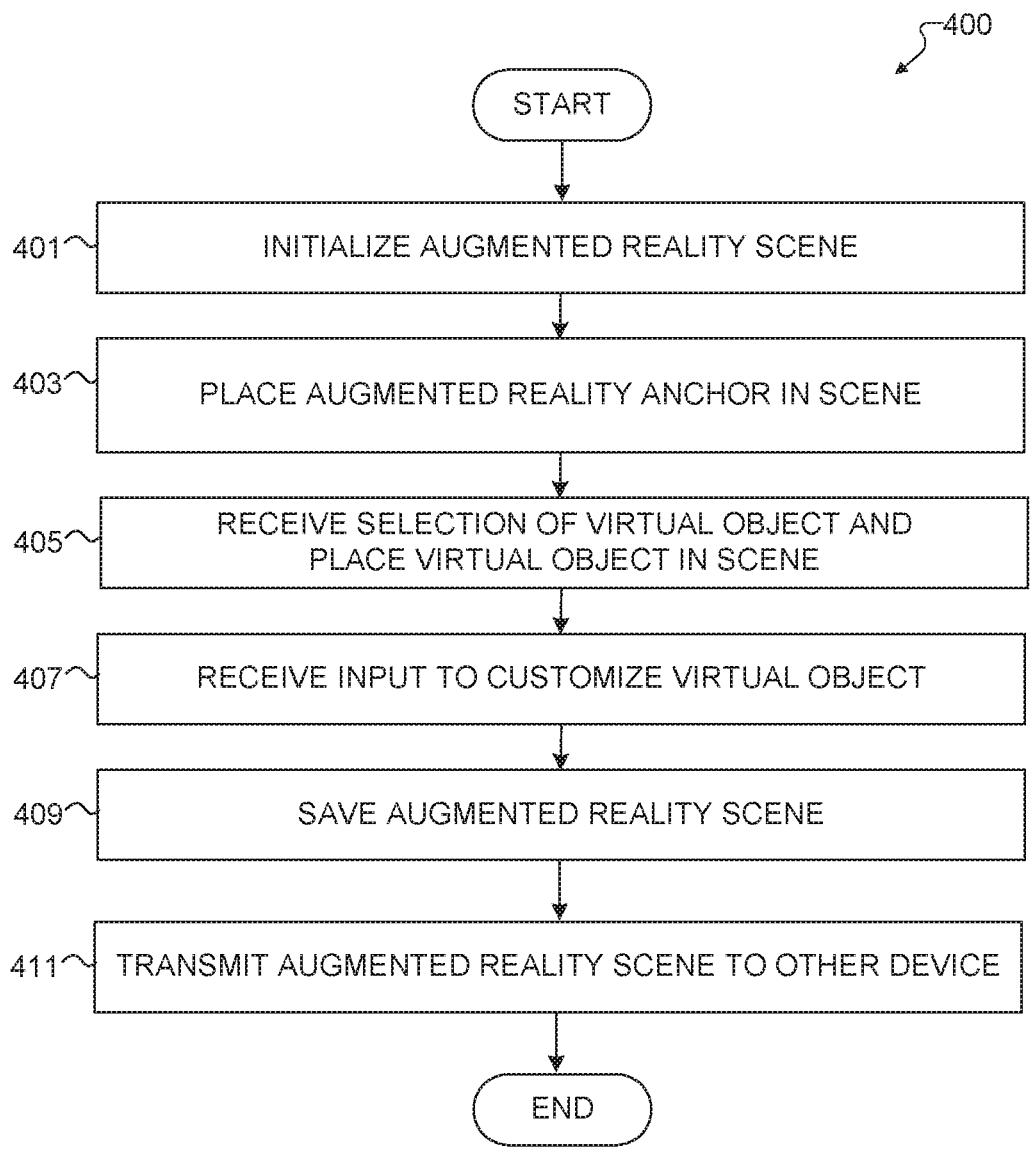
FIG. 4A illustrates an example method for generating and customizing an augmented reality scene in accordance with this disclosure.

FIG. 4A illustrates an example method 400 for generating and customizing an augmented reality scene in accordance with this disclosure. For ease of explanation, the method 400 shown in FIG. 4A may be described as being performed within the network configuration 100 shown in FIG. 1. In particular, the method 400 may be performed using one or more of the electronic devices 101, 102, 104 or the server 106. However, the method 400 may be performed using any other suitable device or system in any other suitable environment. For ease of explanation, the method 400 will be described as being performed by the electronic device 101.

FIGS. 5A through 5E illustrate certain operations of the method 400 for greater understanding.

Figure 5A:
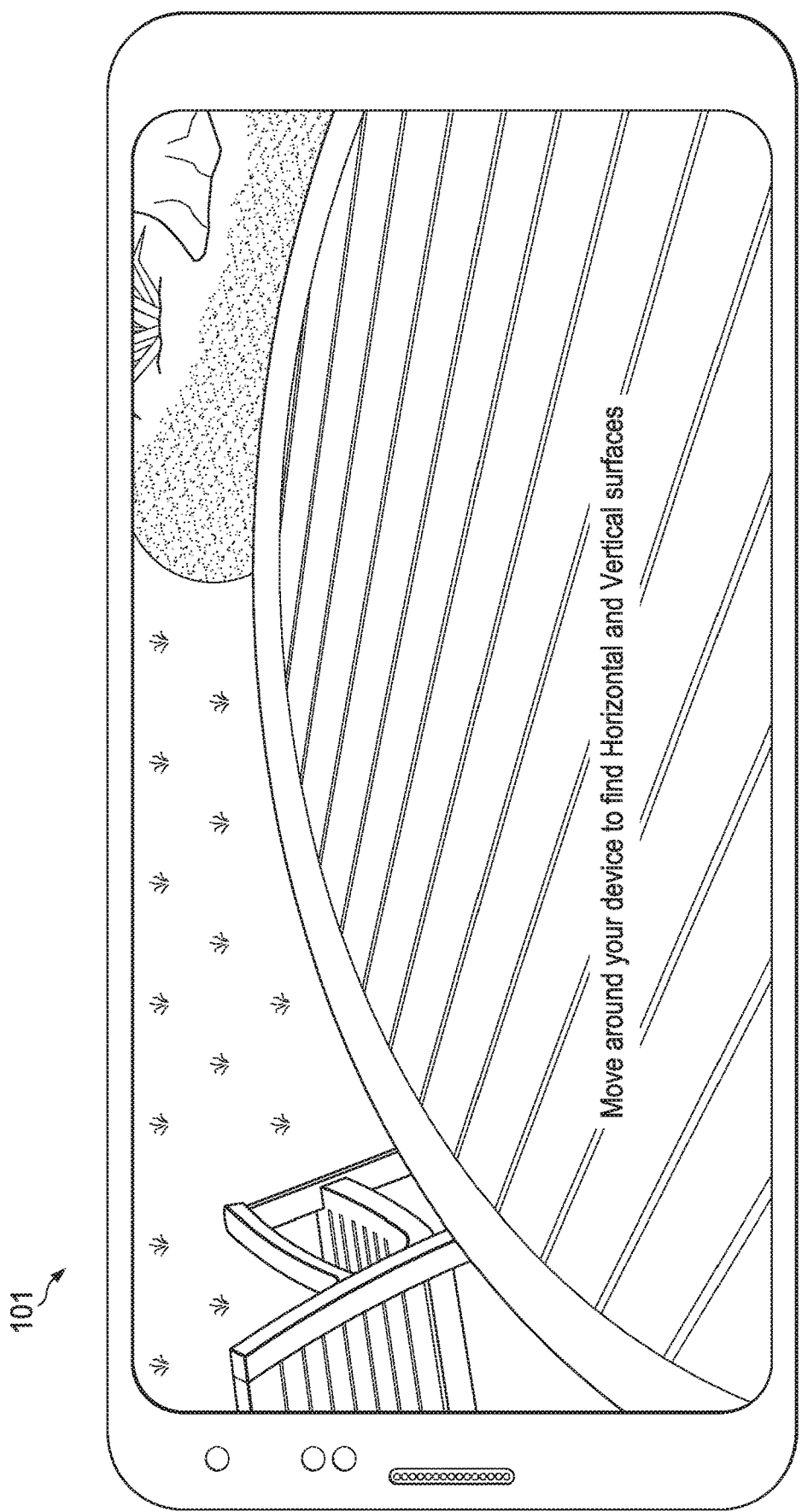
FIGS. 5A through 5L illustrate example operations of the methods of FIGS. 4A and 4B in accordance with this disclosure.

As shown in FIG. 4A, at step 401, the electronic device 101 initializes an augmented reality scene. This can include, for example, the electronic device 101 receiving user input to open an augmented reality scene generation application (or "app") on the electronic device 101. An image sensor of the electronic device 101 (e.g., a camera) activates and receives images of a real world environment. The camera shows the images on the display of the electronic device 101, as shown in FIG. 5A.

Figure 5B:
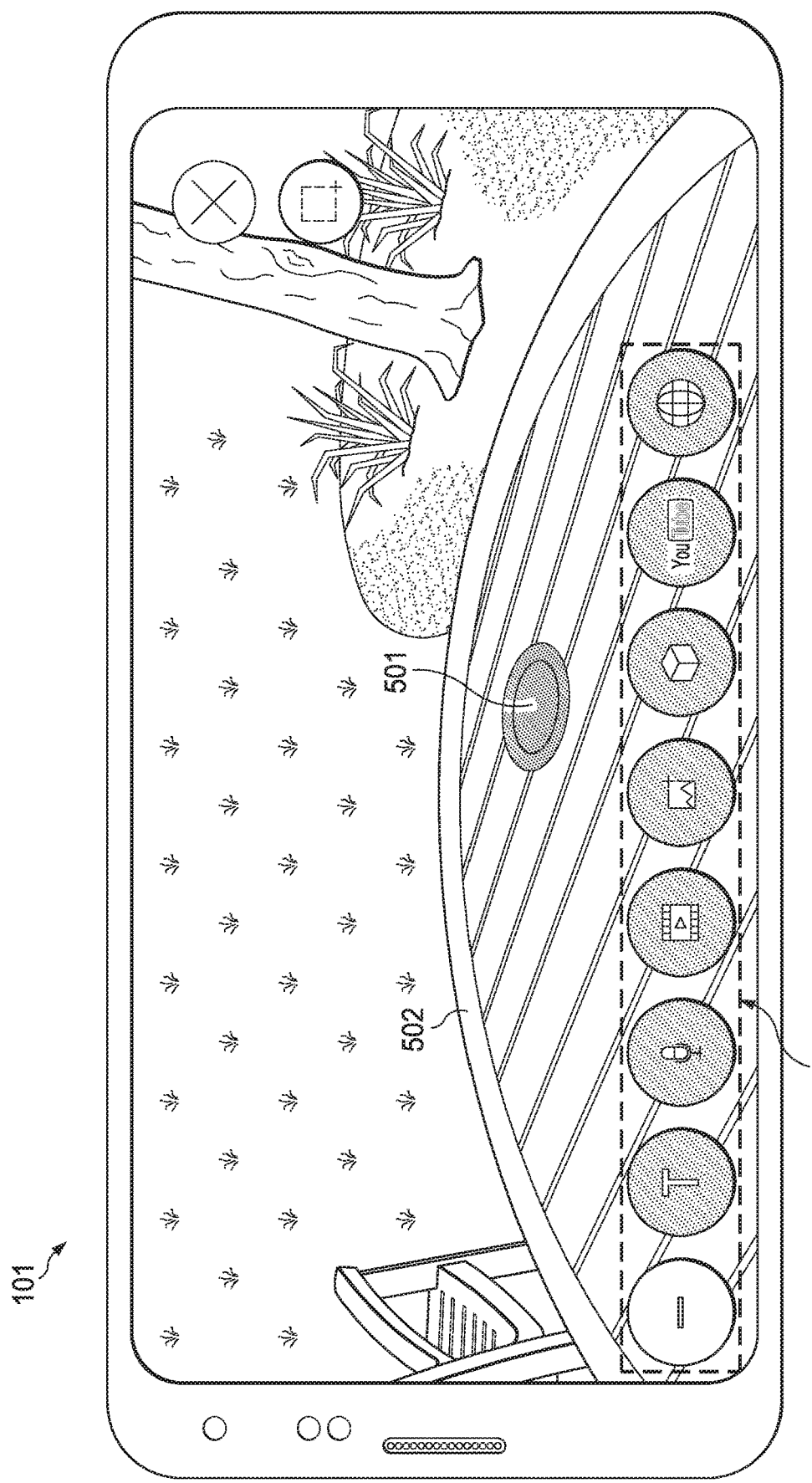

At step 403, the electronic device 101 receives an input for a location of at least one augmented reality anchor point. This can include, for example, the user panning around while holding the electronic device 101 and aiming the camera. When the user determines a suitable location for an anchor point, the user sets the anchor point by touching on the screen, and the electronic device 101 receives the touch input. FIG. 5B shown an anchor point 501 that the user has set on a table top 502 in the camera view. As the electronic device 101 moves and the camera view changes, the anchor point 501 moves also, so as to remain static with respect to the table top 502.

At step 405, the electronic device 101 receives a user selection of one or more virtual objects and the display of the electronic device 101 shows the virtual objects in proximity to the anchor point. For example, as shown in FIG. 5B, the electronic device 101 displays a control menu 503 that overlays the camera feed. The control menu 503 provides various user controls that allow the user to add a virtual object to the scene that will be associated with the anchor point 501. As known in the art, a virtual object is an object that is not physically present in the real world or physical environment. The virtual object can include (but is not limited to) a text box, an audio file, a graphical image, a video file, a 3D object, a map, a webpage, another type of media file, or a combination of two or more of these. The virtual object can be searched for and selected from the memory of the electronic device 101, downloaded from the server 106, searched for and selected from the internet, or obtained in any other suitable manner. Once selected, the virtual object is overlaid onto the scene from the camera feed. A generated point cloud is used to record and maintain position and orientation information of the virtual object.

Figure 5C:
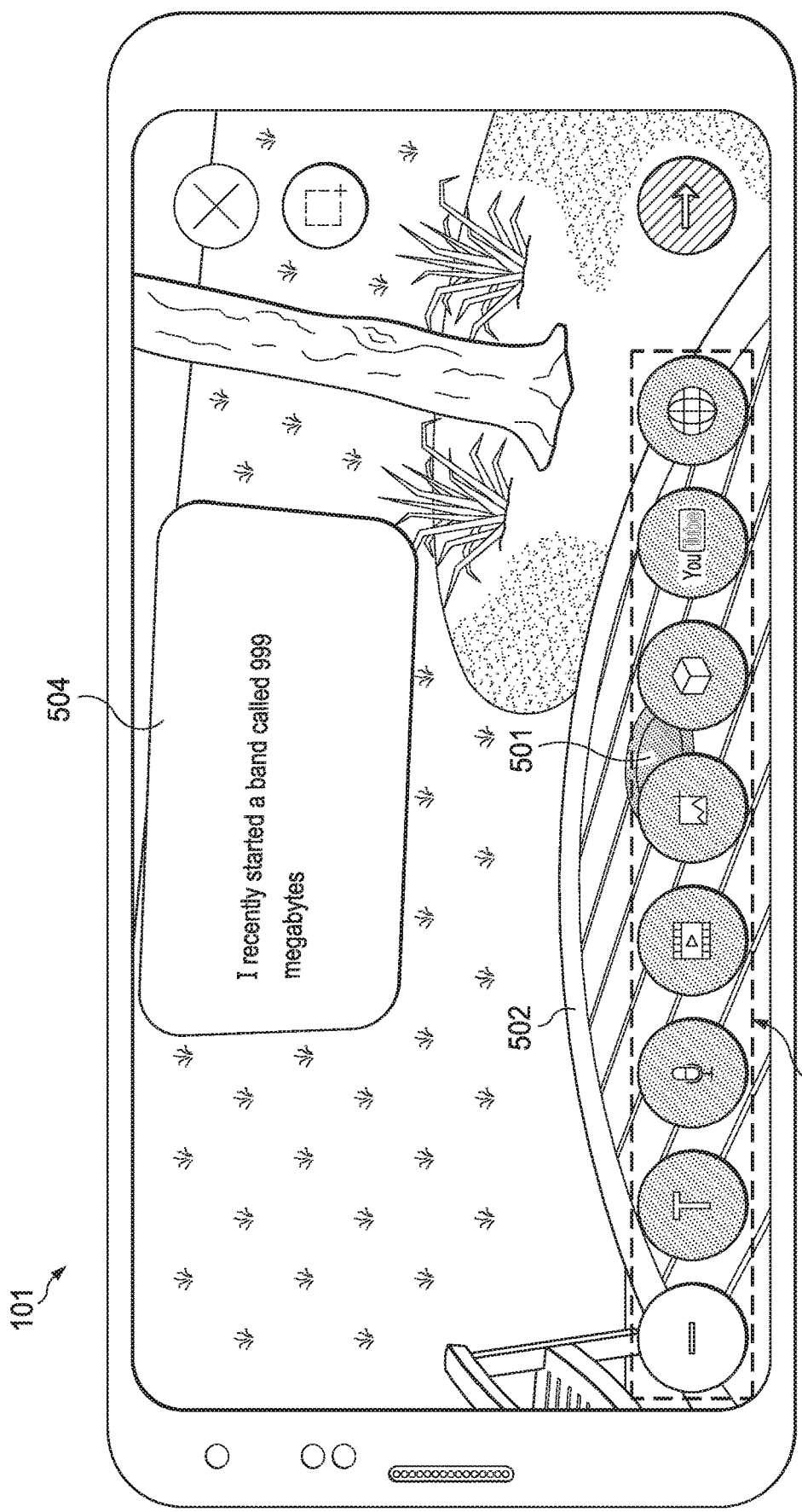

For example, as shown in FIG. 5C, a virtual object 504 in the form of a text box has been generated by the user and placed in the scene and associated with the anchor point 501. In general, when virtual objects are initially placed into the scene, the objects are of standardized sizes and are placed in proximity to the corresponding anchor point to demonstrate the association between the virtual object and the anchor point. In some embodiments, the electronic device 101 initially places virtual objects by casting a ray from the camera perspective and testing the ray against each object in the scene graph for intersection. After objects are placed in the scene, the electronic device 101 allows the user to move the virtual object to be closer to or further from the anchor point.

Figure 5D:
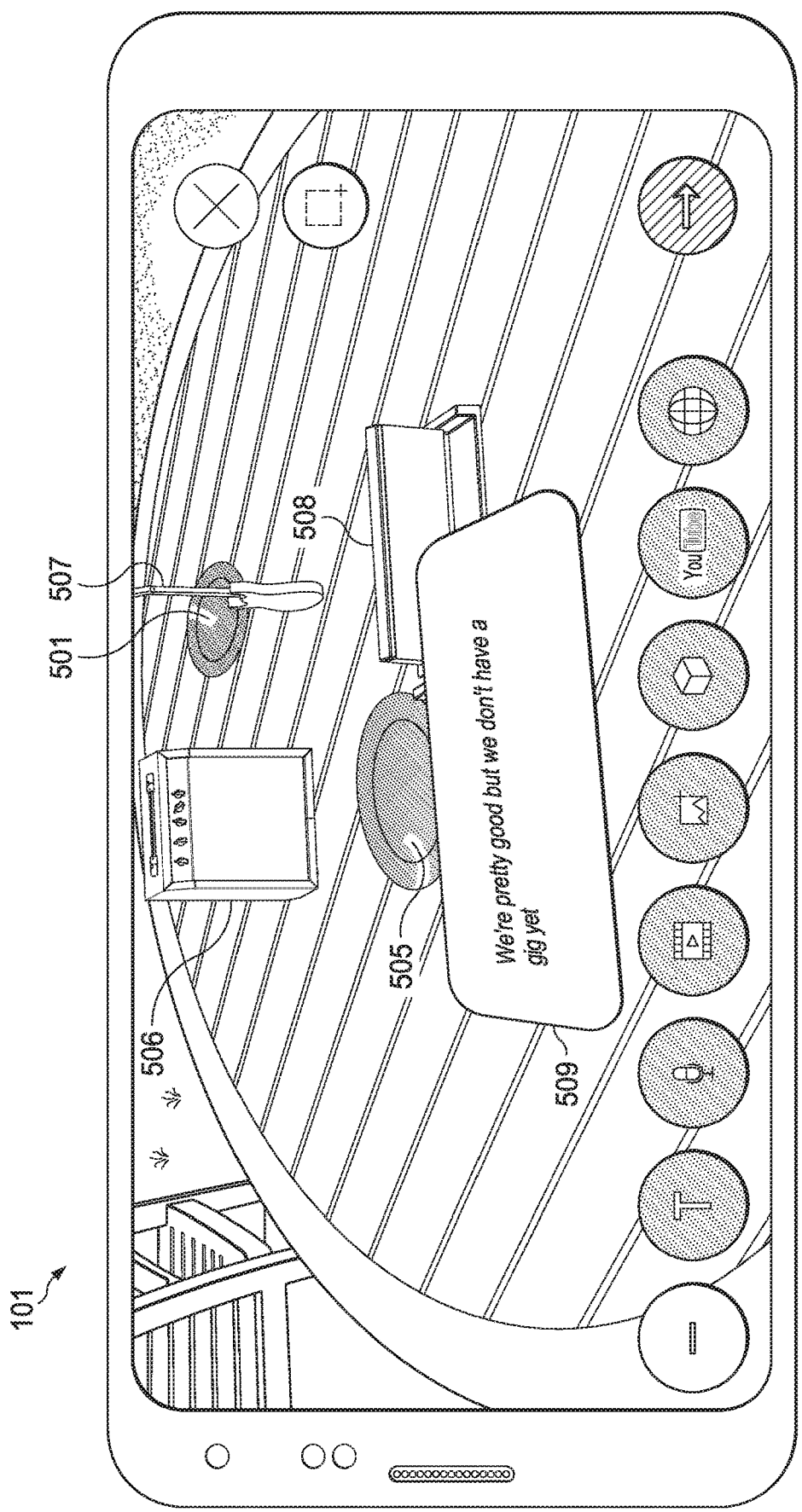

The user can continue to add anchor points and virtual objects to make the scene to the user's satisfaction. As shown in FIG. 5D, a second anchor point 505 has been added and multiple virtual objects 506-509 have been placed around the second anchor point 505. The virtual objects include graphical images of an amplifier 506, a guitar 507, and a synthesizer 508, and a text box 509 populated by the user.

Figure 5E:
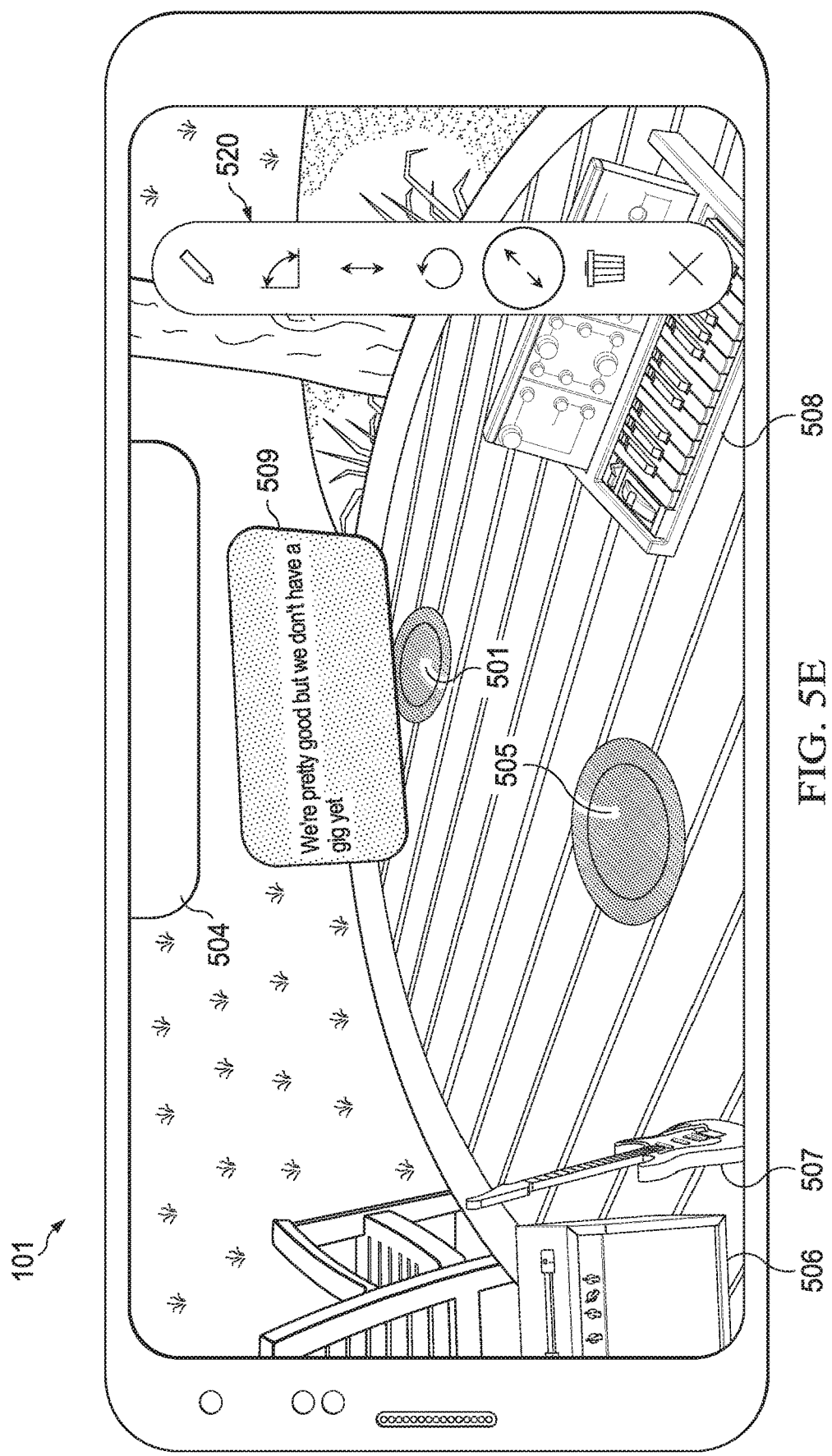

At step 407, the electronic device 101 receives user input for customization of the virtual objects. Customization interactions can include (but is not limited to) dragging objects both vertically and horizontally, rotating objects around three orthogonal axes of rotation, and scaling the size of the objects in the scene. For example, as shown in FIG. 5E, the text box 509 and the graphical images of the amplifier 506, guitar 507, and synthesizer 508 have been resized, rotated, repositioned, or a combination of these, as compared to FIG. 5D. In some embodiments, a control menu 520 that appears on the screen provides buttons or other controls. These controls allow the user to make the customizations, as discussed in the greater detail below in conjunction with FIG. 6. In some embodiments, ray casting can be used to project user input from the camera perspective onto the real world scene. For example, a planar surface may be determined at the object to be manipulated, orthogonal to either the x, y, or z axes. A ray may then be cast from the camera onto that plane to determine where on the plane a user's input corresponds to. This location on the plane may be used to move the object around on the plane, rotate it, or resize it. Choosing a different axis for the plane allows movement and rotation along other dimensions. This allows adjustments to correspond intuitively to user input rather than through a slider or other user interface element. In some embodiments, an optional sticky placement tool allows the user to make positioning more intuitive with respect to detected planes, objects, and the like.

Figure 4B:
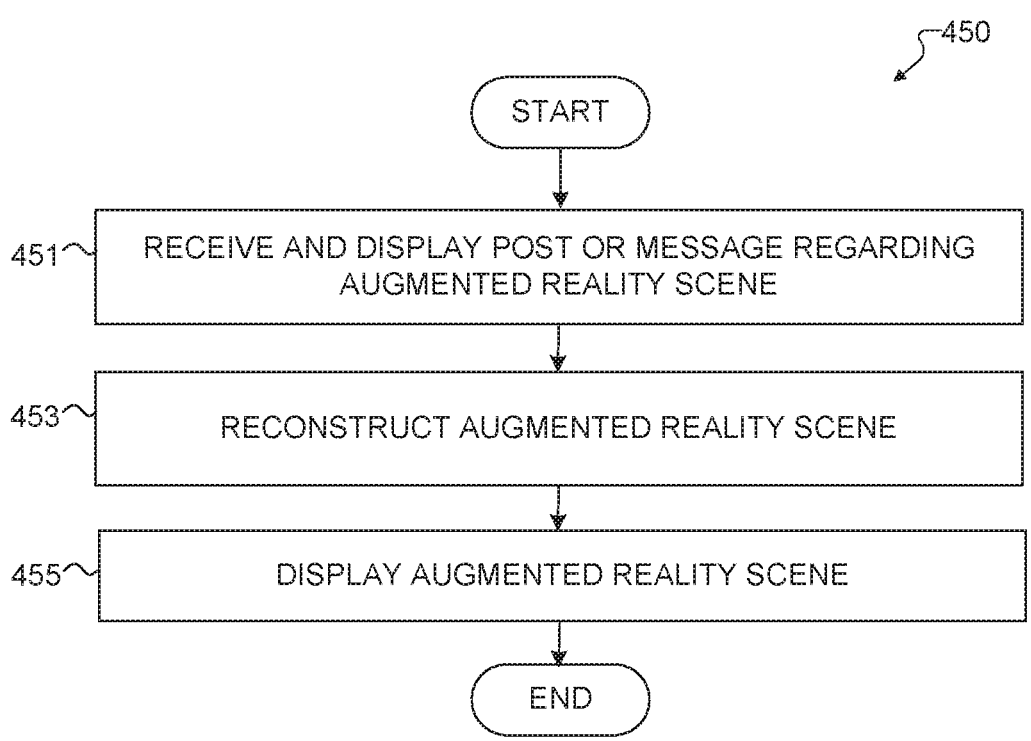
FIG. 4B illustrates an example method for receiving and viewing an augmented reality scene in accordance with this disclosure.

At step 409, the electronic device 101 saves the augmented reality anchor points and their associated virtual objects together as an augmented reality scene. At step 411, the electronic device 101 transmits the augmented reality scene to another device. This can include, for example, the electronic device 101 receiving user input indicating that the scene is complete and saving the scene. The electronic device 101 then uploads the scene to the other device, such as the server 106 or, in the case of a peer-to-peer system, another electronic device (e.g., the electronic device 102). Location information and a name for the scene can also be stored at the other device. If the scene is intended to be viewed by another user (herein referred to as a "receiving user"), a post or a message (such as a text message from the user that generates the scene) can be sent to the receiving user notifying the user of the scene. FIG. 4B below describes a method in conjunction with the receiving user viewing the augmented reality scene.

Although FIG. 4A illustrates one example of a method 400 for generating and customizing an augmented reality scene, various changes may be made to FIG. 4A. For example, while certain steps in FIG. 4A are shown as occurring in a particular order, various steps in FIG. 4A could overlap or occur in parallel. Also, various steps in FIG. 4A could occur in a different order or occur any number of times.

FIG. 4B illustrates an example method 450 for receiving and viewing an augmented reality scene in accordance with this disclosure. For ease of explanation, the method 450 shown in FIG. 4B may be described as being performed within the network configuration 100 shown in FIG. 1. In particular, the method 450 may be performed using one or more of the electronic devices 101, 102, 104 or the server 106. However, the method 450 may be performed using any other suitable device or system in any other suitable environment. For ease of explanation, the method 450 will be described as being performed by the electronic device 101. FIGS. 5F through 5L illustrate example operations of the method 400 for greater understanding.

Figure 5F:
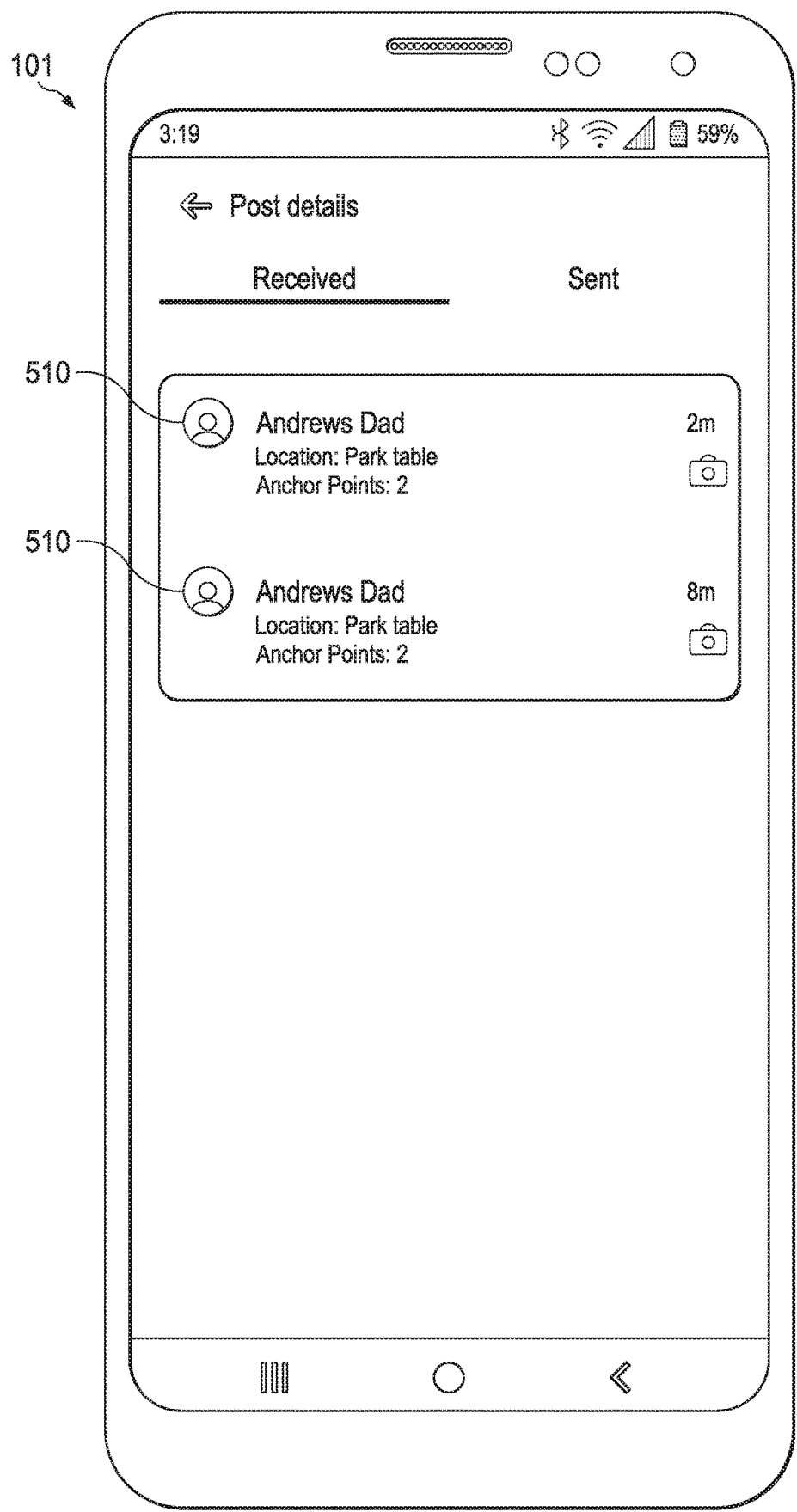

At step 451, the electronic device 101 receives and displays a post or a message (such as a text message from the user that generates the scene) that is sent to the receiving user notifying the user of the augmented reality scene. This can include, for example, the electronic device 101 receiving a message from the server 106 or from the electronic device 101 that created the augmented reality scene. For example, FIG. 5F shows an electronic device 101 of a receiving user. The screen of the electronic device 101 shows posts 510 of two augmented reality scenes that can be viewed by the receiving user.

Figure 5G:
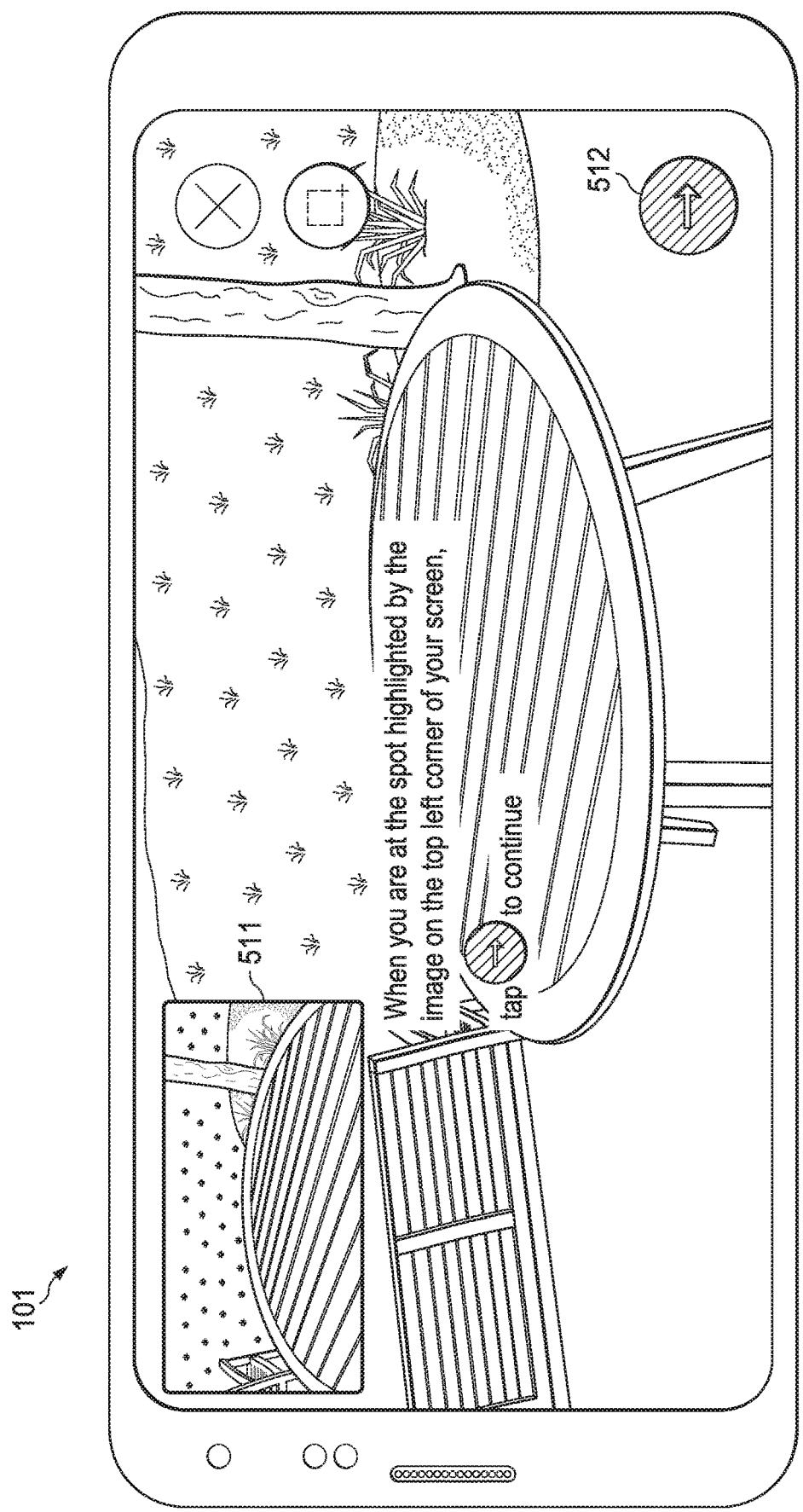

At step 453, the electronic device 101 reconstructs the augmented reality scene. In some embodiments, the electronic device 101 reconstructs the scene by downloading the virtual objects from the server 106 and placing the virtual objects in the scene based on their relationship to the anchor points. In other embodiments, such as in a peer-to-peer network, the electronic device 101 receives the data for the scene from the creating electronic device 101 without input from the server 106. In some embodiments, when the receiving user's electronic device 101 comes to the location of the scene, the electronic device 101 displays a notification about the scene, such as the posts 510. In some embodiments, the electronic device 101 notifies the receiving user of the scene in advance, such as by a text message. When the receiving user opens a post 510, the electronic device 101 displays information to assist the receiving user to find the location of the scene. For example, as shown in FIG. 5G, the electronic device 101 can display a thumbnail image 511 in the camera view. The receiving user uses the thumbnail image 511 as a guide to move to the location that matches the thumbnail.

Figure 5H:
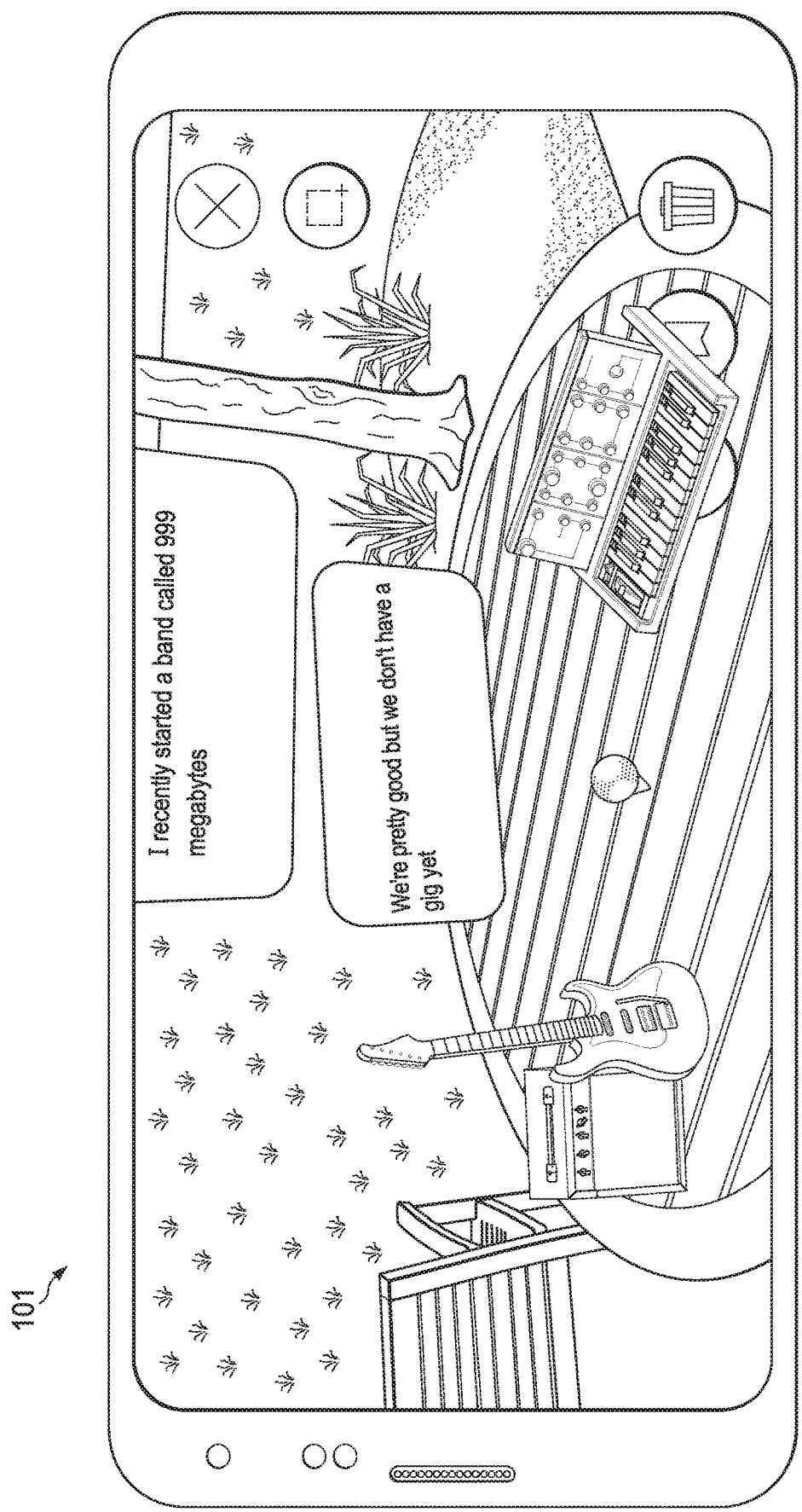

At step 455, the electronic device 101 displays the augmented reality scene for the receiving user to view. This can include, for example, the electronic device 101 providing a control 512 to display the scene. Once the receiving user is at the location of the scene, the user can actuate the control 512 to display the scene. FIG. 5H shows the augmented reality scene displayed on the screen of the electronic device 101.

Figure 5I:
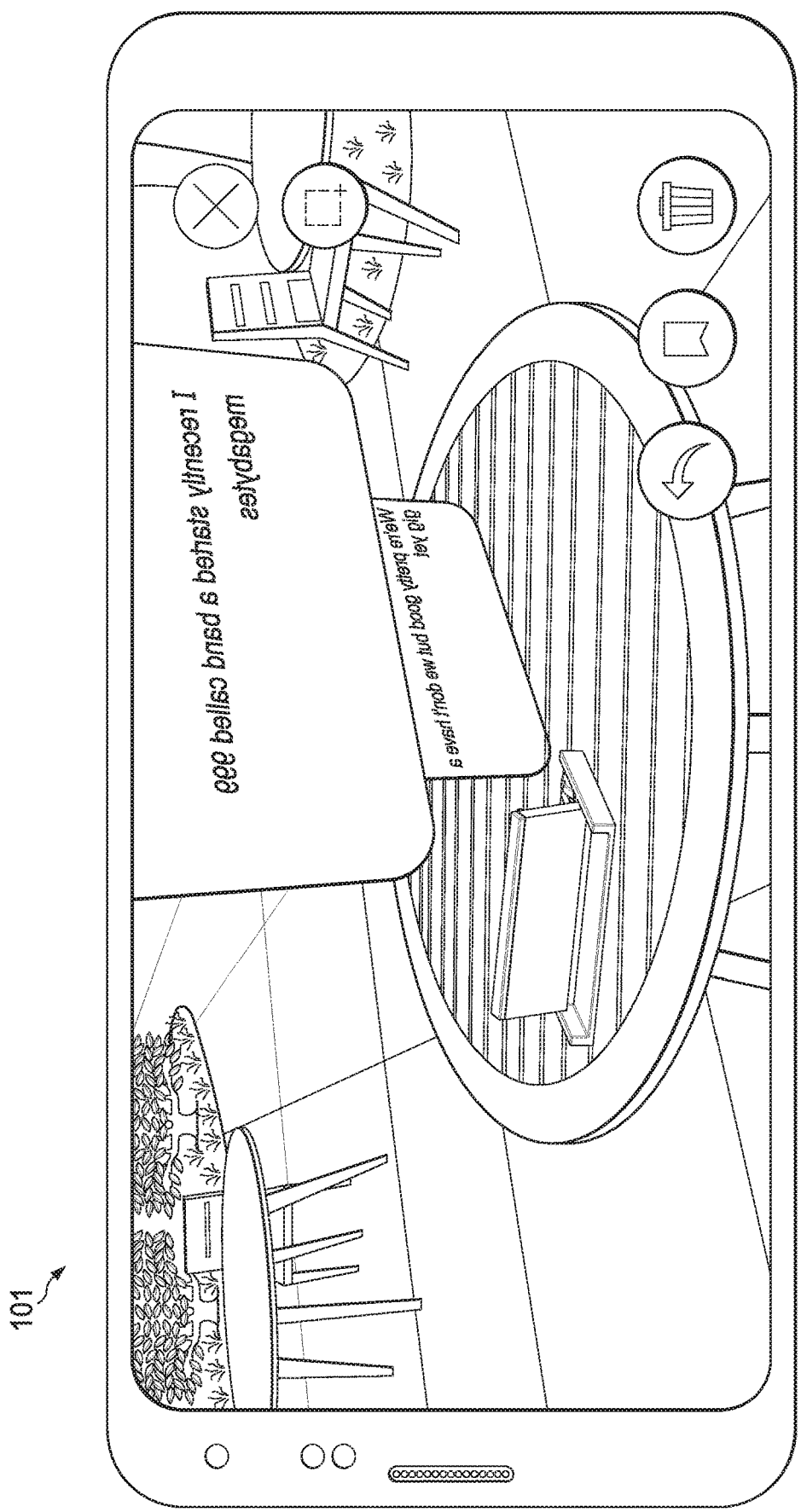

While viewing the scene, the receiving user can move the electronic device 101 around the scene, and the virtual objects change appearance as though they are actual 3D objects. For example, as shown in FIG. 5I, when the receiving user moves to the other side of the table, the electronic device 101 displays the scene with the back side of the virtual objects shown. Once the receiving user views the scene, the receiving user can reply to the originating user, bookmark the scene, or delete the post indicating the scene.

To view an augmented reality scene with all of the real world elements that the creator encountered, the receiving user should be at the location where the augmented reality scene was generated. That way, the receiving user can view the same real world content that was associated with the virtual objects in the scene. However, in some embodiments, it can be advantageous for the receiving user to be able to view at least parts of the augmented reality scene at any location—not necessarily the same location where the augmented reality scene was generated.

Figure 5J:
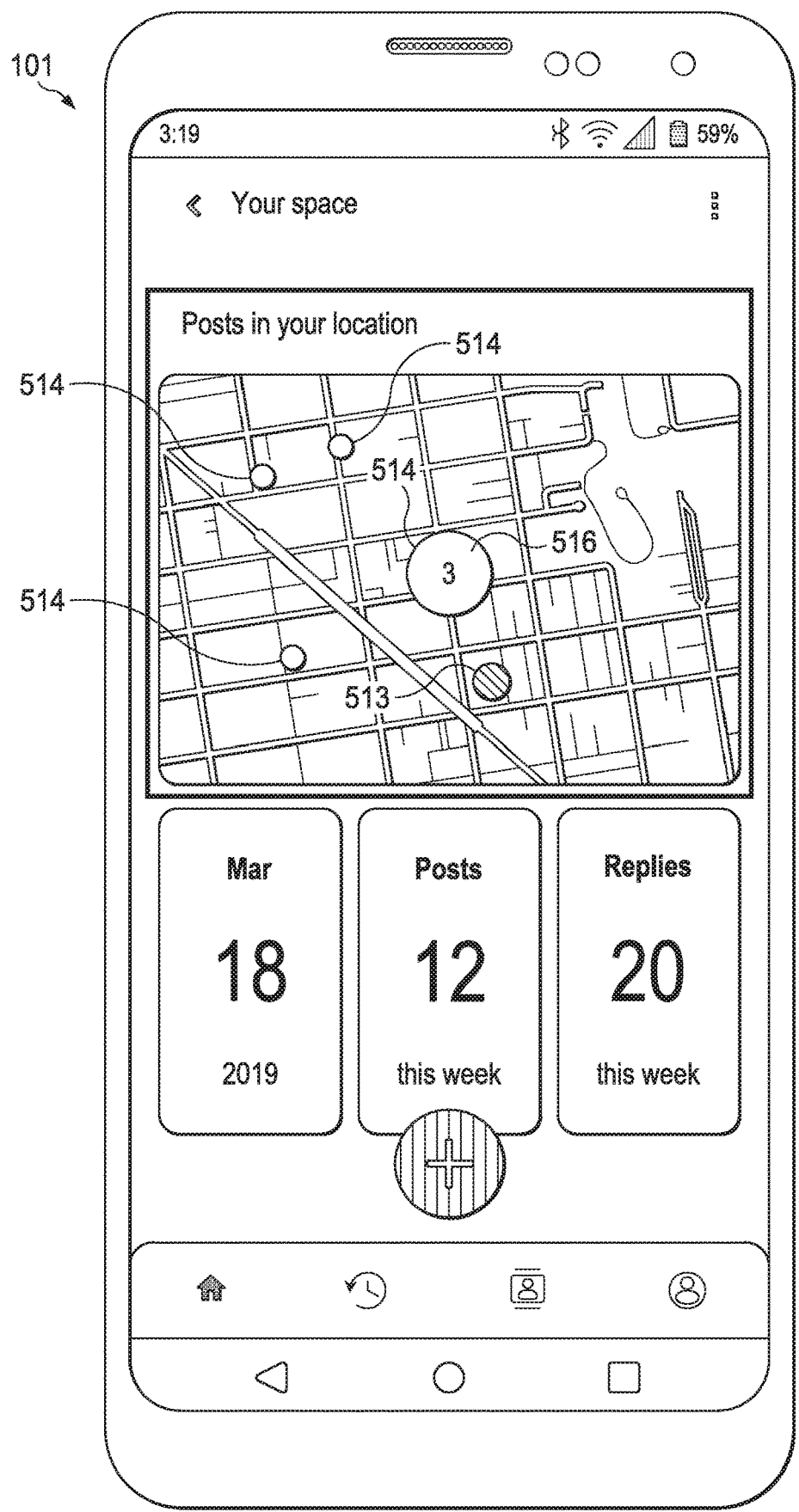

For example, as shown in FIG. 5J, the electronic device 101 can provide a map view that show the receiving user's current location 513 and the augmented reality posts 514 at or near the current location 513, along with a post count 516 at each location if multiple posts exist at that location. The map view can also show posts at other locations around the world, if the user navigates within the map view.

To see an augmented reality scene at a location that is different from the current location, the receiving user can click on any post at any location in the map view. When the receiving user clicks on a particular post, the user can choose to see all of the augmented reality data associated to that post on the screen of the electronic device 101. If the electronic device 101 is in a non-AR mode, the user can view the content (e.g., read text message, see videos, see 3D objects, etc.) on the display screen without AR. Alternatively, if the electronic device 101 is in AR mode, the user can click on any post to view the associated virtual content in AR mode. For example, the user can activate the camera of the electronic device 101 and view any surface or plane with all the virtual content of that post rendered on that surface or plane.

Figure 5K:
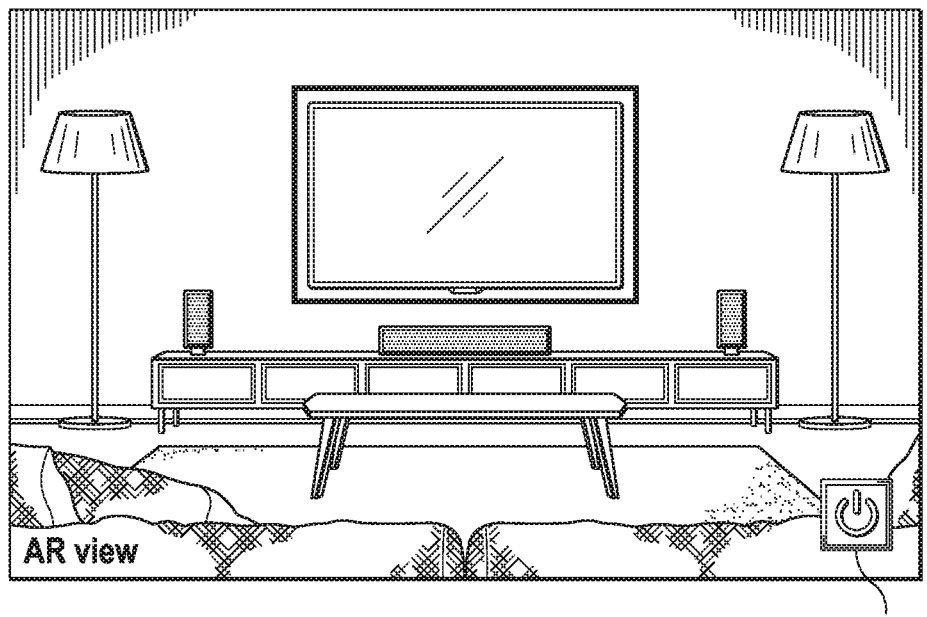
Figure 5L:
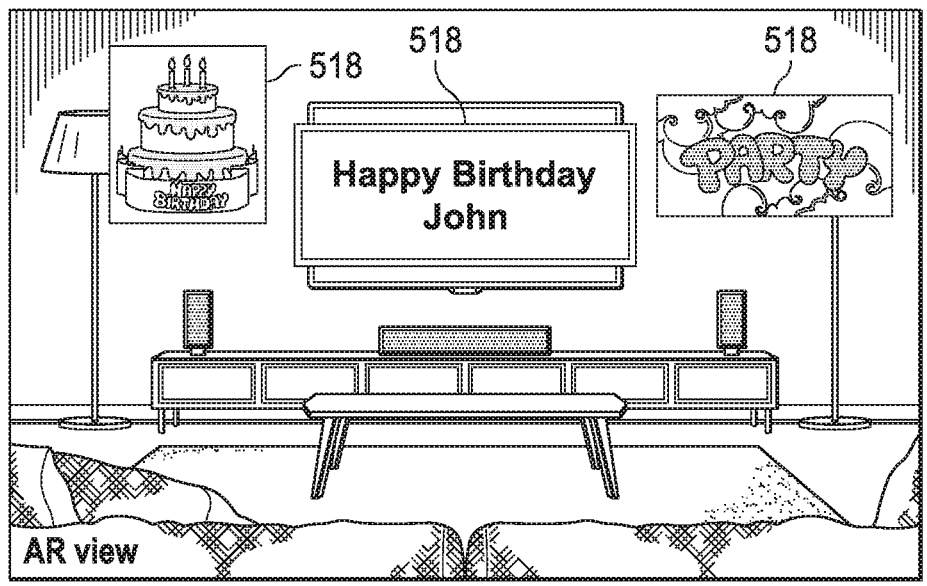

In some embodiments, one or more virtual objects in an augmented reality scene can include a virtual control. The virtual control allows the receiving user to see some of the virtual content only after actuating the virtual control, and not by default. For example, as shown in FIG. 5K, the electronic device 101 of the receiving user displays an augmented reality scene with a virtual control 517. When the user views the scene in AR mode, by default only the virtual control 517 is shown and the remaining virtual content is hidden. When the user actuates the virtual control 517, the control operates like a virtual switch and the remaining virtual objects 518 are displayed in the scene, as shown in FIG. 5L.

In some embodiments, the virtual control 517 and the other virtual content can be tied to a real world object, like the television shown in FIG. 5K. When a receiving user view the same real world object at any location, the virtual control 517 appears in the scene. Then, when user actuates the virtual control 517, the remaining virtual objects 518 are displayed in the scene.

Although FIG. 4B illustrates one example of a method 450 for receiving and viewing an augmented reality scene, various changes may be made to FIG. 4B. For example, while certain steps in FIG. 4B are shown as occurring in a particular order, various steps in FIG. 4B could overlap or occur in parallel. Also, various steps in FIG. 4B could occur in a different order or occur any number of times.

Figure 6:
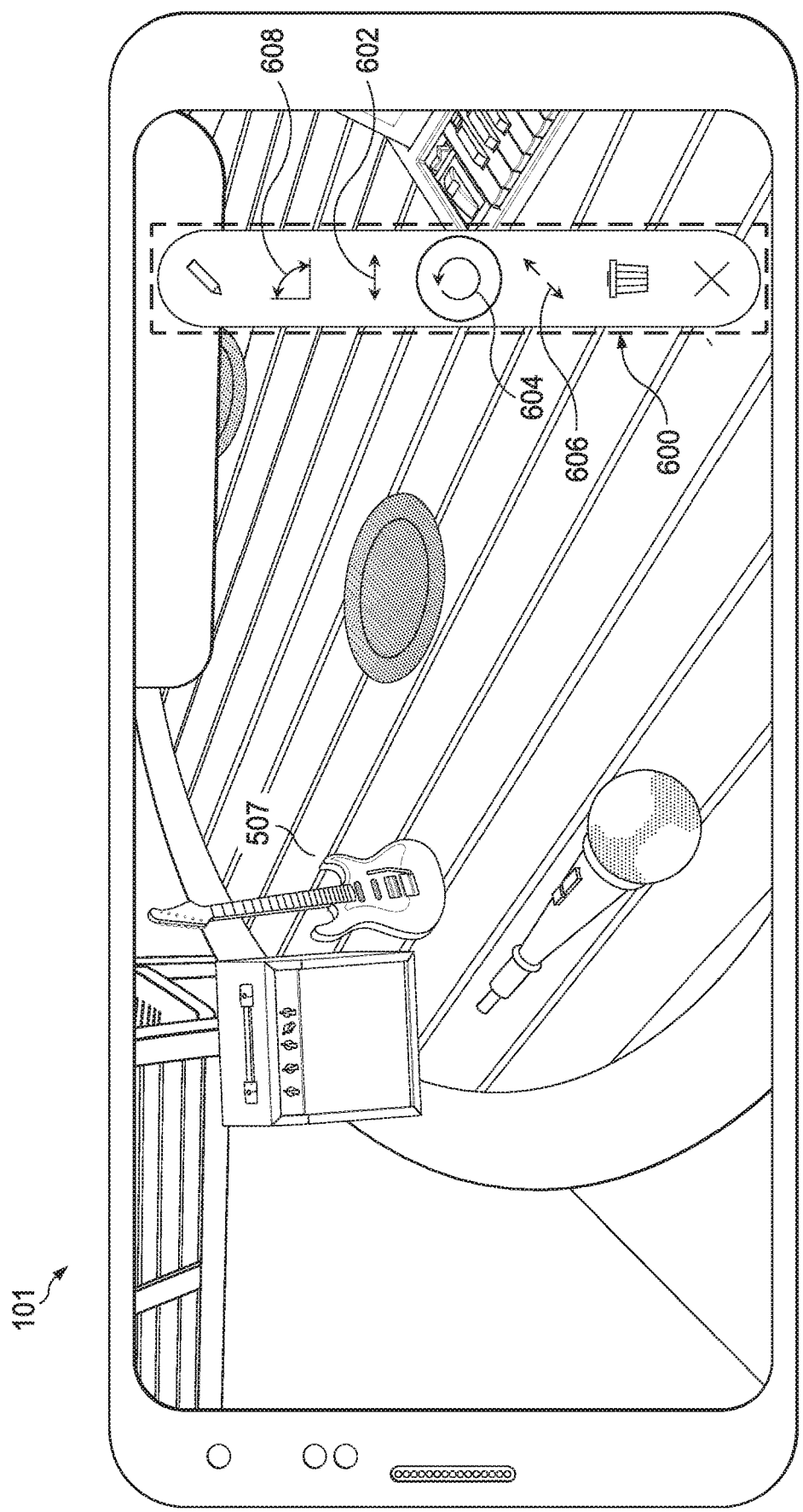
FIG. 6 illustrates an example customization control menu for customizing a virtual object in accordance with this disclosure.

FIG. 6 illustrates an example customization control menu 600 for customizing a virtual object in accordance with this disclosure. For ease of explanation, the customization control menu 600 may be described as being used in conjunction with the method 400 shown in FIG. 4A. In particular, the customization control menu 600 can represent the control menu 520 of FIG. 5E and can be displayed on the screen of the electronic device during step 407 of the method 400. However, the customization control menu 600 may be used in any other suitable process or device.

As shown in FIG. 6, the customization control menu 600 is a context menu that is displayed after one or more virtual objects have already been added to the scene. In some embodiments, the customization control menu 600 is displayed on the screen when the user selects a virtual object (e.g., the guitar 507) to edit or customize. The customization control menu 600 includes multiple customization controls, including (but not limited to) an object dragging control 602, an objection rotation control 604, and an object scaling control 606.

In some embodiments, an object dragging mode may be activated after the user actuates (e.g., clicks on) the object dragging control 602. When this mode is active, the virtual object can be moved around the scene either along a plane or along an orthogonal axis by dragging a finger along the touchscreen. The plane or axis along which the virtual object is being dragged can be changed by actuating a flip control 608 in the customization control menu 600.

In some embodiments, to implement dragging along horizontal planes, two vectors $v_x$; $v_z$ along the plane and the position of the object p are acquired in world coordinates. Then for a touch event on the touchscreen, a ray is generated with an origin at the tap position, and a direction in the direction of the center of the camera's field of view. This ray can be defined as:

$$r(k_r) = v_{orig} + k_r v_{dir}$$

where k is a nonnegative real number.

Similarly, the horizontal plane the object is resting on can be defined as:

$$P(k_x; k_z) = p + k_x v_x + k_z v_z.$$

On a tap event, to find the correct position to drag to in world coordinates, it may be necessary to find $k_r$; $k_x$; $k_z$ that make $r(k_r) = P(k_x; k_z)$. This can be determined by solving the following:

$$-k_r v_{dir} + k_x v_k + k_z v_z = v_{orig} - p$$

by forming matrix $V = [(-_{dir}; v_x; v_z]^T$ and finding $k = V^{-1} (v_{orig} - p)$.

Then the new position can be found by plugging these into the plane expression. This allows finding the position of any tap on the horizontal plane that an object is resting on and translating the object there.

For dragging vertically, the same logic is used except only the vertical vector $v_y$ is used and the least squares solution is taken instead of the matrix inverse, to minimize the distance of the tap vector to the point found on the vertical vector.

In some embodiments, an object rotation mode may be activated after the user actuates the object rotation control 604. When this mode is active, the virtual object can be rotated by tapping and holding on any point in the scene, then dragging the point to other points in the scene. The angle the object is rotated is proportional to the angle between the start and end points if the object's position is taken as the origin. The axis around which the object is being rotated can be switched between the x, y, and z axes by actuating a flip control 608.

To implement rotation, the same or similar plane intersection logic from object dragging can be used. On the initial tap, the tap vector intersection with the plane is recorded. When the cursor is dragged, each new intersection point is recorded and the angle between the new point and the original point is found. When the cursor is lifted, the recorded point is reset.

In some embodiments, an object scaling mode may be activated after the user actuates the object scaling control 606. When this mode is active, the virtual object's scale can be adjusted by using a pinch gesture. If two points on the screen are tapped and held at the same time, pinching so that the points are closer together will result in decreasing the object's scale, and moving the points further apart will increase the object's scale.

In some embodiments, object scaling may be implemented using the same principles as object rotation. That is, when two pointer touch start events are recorded, the distance between the initial points are stored and when the pointers are pinched inward or outward, the ratio of the new distance to the initial distance is used to modify the scale of the virtual object's transform object and change its render scale.

When multiple virtual objects are already in the scene, adding new virtual objects to the scene in arbitrary positions may cause the new objects to be occluded by older objects or vice versa. This could cause some objects to be invisible to the user or non-interactable with the preceding methods. To resolve this, the following methods may determine proper object placement to avoid occlusion and minimize clutter on the display screen.

Figure 7:
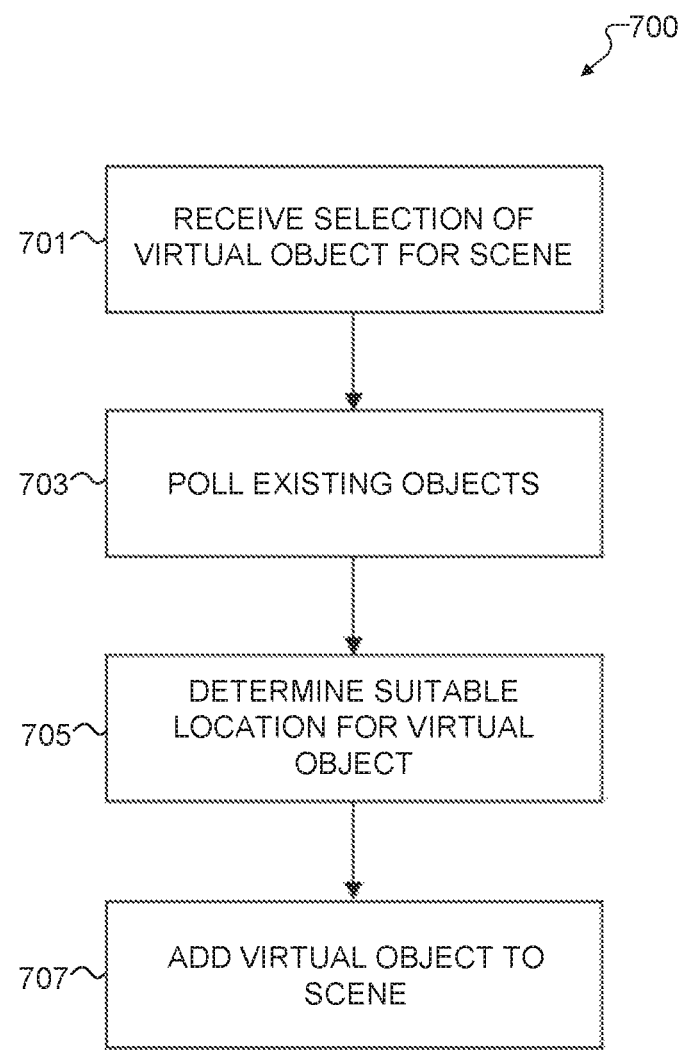
FIG. 7 illustrates an example process for intelligent object placement in an augmented reality scene in accordance with this disclosure.

FIG. 7 illustrates an example process 700 for intelligent object placement in an augmented reality scene in accordance with this disclosure. For ease of explanation, the process 700 may be described as being performed within the network configuration 100 shown in FIG. 1. In particular, the process 700 may be performed by the electronic device 101 as part of the method 400 of FIG. 4A, e.g., in conjunction with step 405. However, the process 700 may be performed using any other suitable device in any other suitable environment.

At step 701, the electronic device 101 receives a selection of a virtual object for inclusion in the augmented reality scene. This may include, for example, the electronic device 101 receiving a user input on a touchscreen, where the user input indicates the selected virtual object.

At step 703, the electronic device 101 polls existing objects in the scene to determine their locations and properties. Objects that are placed in the scene have attached render data, which can be used to determine a bounding box that the object visually lies in. The electronic device 101 can extract bounding boxes from data objects by considering the 3D extent of the render data of the object and storing corner vertices. With multiple objects in the scene, the electronic device 101 can track each bounding box in order to determine the overall region of space already covered by existing objects. In some embodiments, existing bounding boxes may be merged into an overall bounding polygon of existing data, which may then be triangulated into a format such as STL (Standard Triangle Language or Standard Tessellation Language) for representation of the 3D object.

At step 705, the electronic device 101 determines a suitable location for the new virtual object. This can include, for example, the use of bounding boxes. If a new object is to be placed near an anchor point on a specific plane, the electronic device 101 can project the set of bounding boxes that is close to the plane (e.g., within half the width of the new object's bounding box) onto the plane to gain a 2D map of prohibited positions for a new object on the plane. With this map, the electronic device 101 can test new object positions near the anchor point using the bounding box of the new object to see if there is any intersection. Starting from near the object, the electronic device 101 can sample points in a radial fashion, where first points at a specific radius are tested and the radius is increased if no suitable points at that radius are found. This may prioritize placing new objects near the anchor point, and will find a point reasonably close to the anchor point where the new object will likely be free of occlusion.

In addition to, or as an alternative to, using bounding boxes, the electronic device 101 could determine a suitable location for a new virtual object based on volumetric spaces of existing objects. For example, each existing object can have a volumetric space that is defined by a convex hull. Such a convex hull can be determined by examination of corners of bounding boxes or by any other suitable volumetric measurement technique. Once the volumetric space of each existing object is determined, the electronic device 101 can algorithmically project the new virtual object onto the convex hull from any point outside the volumetric space using a suitable convex set projection technique. This will provide a location for the new virtual object that is close to the existing objects but does not intersect any of them.

At step 707, the electronic device 101 adds the new virtual object to the scene. In some embodiments, the electronic device 101 can perform a new object placement check by checking a new object insertion point containment in bounding polygons by counting ray intersections with the bounding object from the insertion point to any point in the exterior.

Figure 8:
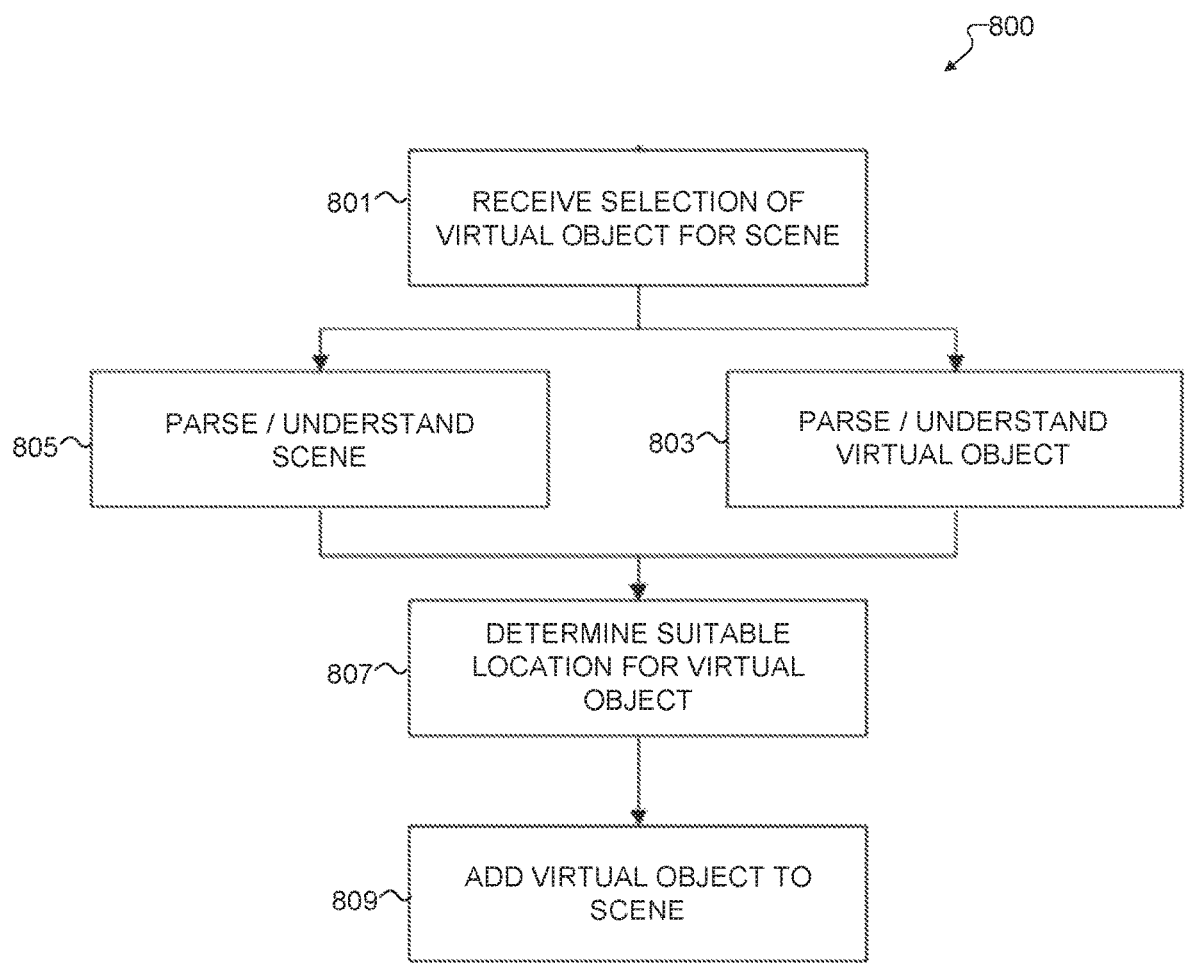
FIG. 8 illustrates an example process for intelligent object placement in an augmented reality scene based on scene context in accordance with this disclosure.

FIG. 8 illustrates an example process 800 for intelligent object placement in an augmented reality scene based on scene context in accordance with this disclosure. For ease of explanation, the process 800 may be described as being performed within the network configuration 100 shown in FIG. 1. In particular, the process 800 may be performed by the electronic device 101 as part of the method 400 of FIG. 4A, e.g., in conjunction with step 405. However, the process 800 may be performed using any other suitable device in any other suitable environment.

In some embodiments, the process 800 is an alternative to, or can used in conjunction with, the object placement process 700 of FIG. 7. The process 800 is based on scene and object understanding. At step 801, the electronic device 101 receives a selection of a virtual object for inclusion in the augmented reality scene. This may include, for example, the electronic device 101 receiving a user input on a touchscreen, where the user input indicates the selected virtual object.

At step 803, the electronic device 101 parses or examines the virtual object to determine properties of the virtual object. Additionally or alternatively, at step 805, the electronic device 101 parses or examines the augmented reality scene to determine properties of the augmented reality scene. In some embodiments, only one of steps 803 or 805 is performed. In other embodiments, both steps 803 and 805 are performed. Steps 803 and 805 can be performed concurrently or sequentially in any order. When placing a virtual object into a scene, the electronic device 101 can recognize the object's properties either through an object understanding algorithm, through a system of property tagging, or a combination of the two. The scene itself may be understood through a scene understanding algorithm, which can label the 3D representation of the real world scene with properties based on the object's context. In some embodiments, the scene understanding algorithm can include an instance segmentation method that can paint the scene with tags. Different regions of the camera-captured scene can be segmented, and then classified tags in each part of scene can be associated to the appropriate area of the point cloud. Each new virtual object to be placed into the scene can also have associated tags based on the content being inserted.

At step 807, the electronic device 101 determines a suitable location for the new virtual object. This can include the electronic device 101 using outputs of the object understanding algorithm and the scene understanding algorithm to determine a location for the new virtual object in the scene where it makes logical sense. In some embodiments, this can include the electronic device 101 comparing tags of the virtual object being inserted to tags of objects already populated in the scene to determine a good placement location based on context. The tags define the category of each real or virtual object and can be used to establish an association between a category of a virtual object and a category of a real, physical object. For example, a scene understanding algorithm can examine a view of a kitchen table with chairs, understand that the table and chairs are together as a group, and determine that a virtual chair object could be placed in the scene. In particular, the virtual chair could be automatically resized to have an initial display size that has approximately the same dimensions as the real chairs, and could be automatically positioned close to the table in a location where a chair would logically be placed in a kitchen table set (e.g., around the table with the other chairs). As another example, in a scene of a wall with hanging art (e.g., posters, paintings, pictures, etc.), it could be determined that similar virtual objects (images, videos, web page views, etc.) should be placed onto the wall as part of a grouping of real and virtual art.

At step 809, the electronic device 101 adds the new virtual object to the scene at the determined location.

Figure 9:
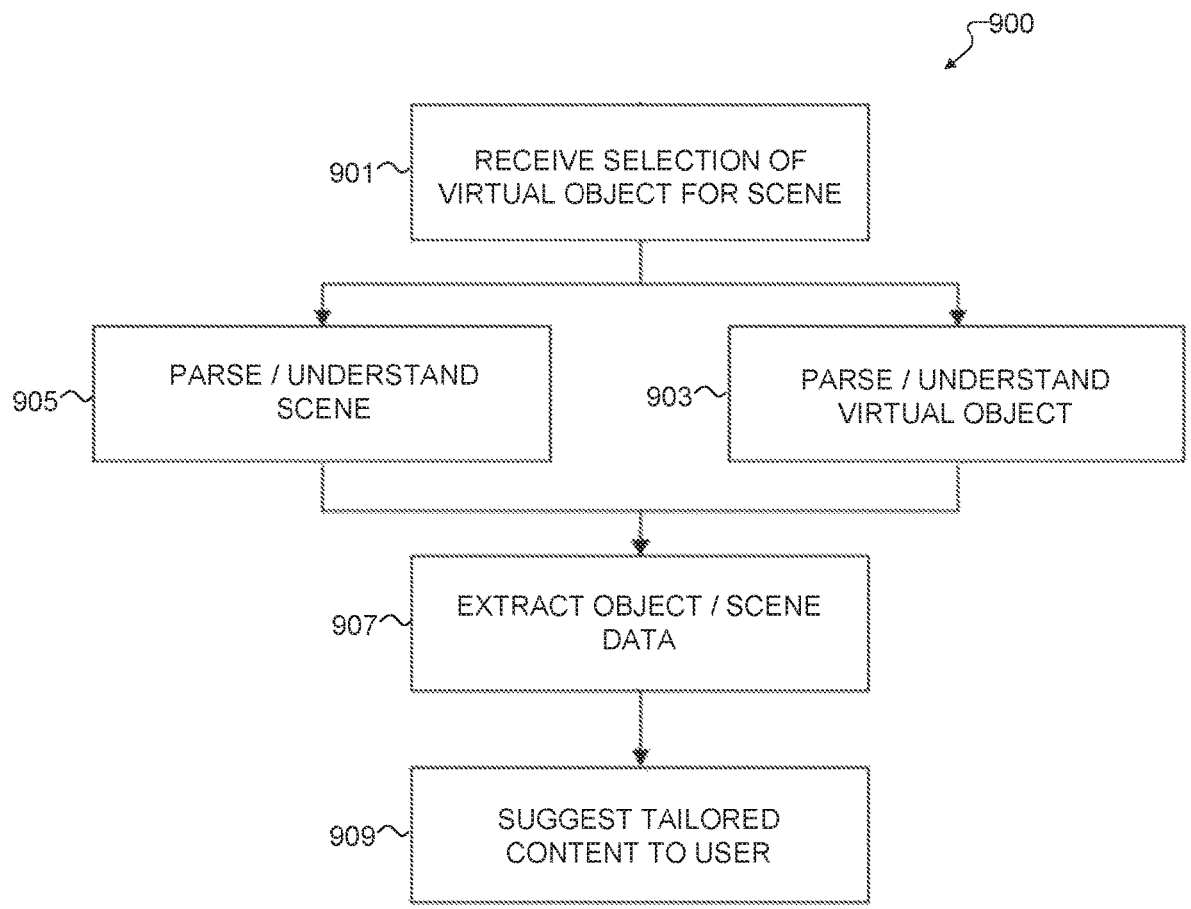
FIG. 9 illustrates an example process for determining user interest in accordance with this disclosure.

FIG. 9 illustrates an example process 900 for determining user interest in accordance with this disclosure. The process 900 can be used to track a user's preferences or current situation based on what virtual objects the user adds into an augmented reality scene. For ease of explanation, the process 900 may be described as being performed within the network configuration 100 shown in FIG. 1. In particular, the process 900 may be performed by the electronic device 101 as part of the method 400 of FIG. 4A, e.g., in conjunction with step 405. However, the process 900 may be performed using any other suitable device in any other suitable environment.

At step 901, the electronic device 101 receives a selection of one or more virtual objects already added to the scene for examination. This may include, for example, the electronic device 101 receiving a user input on a touchscreen, where the user input indicates the selected virtual object.

At step 903, the electronic device 101 parses or examines the selected virtual objects to determine properties of the virtual object. Additionally or alternatively, at step 905, the electronic device 101 parses or examines the augmented reality scene to determine properties of the augmented reality scene. Steps 903 and 905 are substantially similar to steps 803 and 805 of FIG. 8, and can be performed concurrently or sequentially in any order. In some embodiments, the electronic device 101 can perform steps 903 and 905 by implementing an object understanding algorithm, a property tagging system, a scene understanding algorithm, or a combination of two or more of these.

At step 907, the electronic device 101 extracts data associated with user interest from the virtual objects and the scene itself. The virtual objects (which can include text notes, web pages, videos, etc.) can provide information about what the user is currently thinking about or interested in. For example, the electronic device 101 can extract tags of data objects from the content being inserted, examine text notes for language features, examine images and videos for image features, extract webpage content from webpages, determine object types from 3D objects, or any combination of two or more of these. In some embodiments, the electronic device 101 can input the extracted information to a server-side content provider algorithm to find related content to display that is associated with user interests or preferences.

At step 909, the electronic device suggests content to the user that is tailored to the user's interests or preferences. This can include, for example, the user's electronic device 101 receiving suggested content from the server 106 and displaying the suggested content on the touchscreen for review by the user. In one example scenario, such user interests may be used for marketing. For example, if a user places virtual note boxes about food or 3D virtual objects that look like food, this data and GPS data from the user's electronic device 101 could be used to show ads about nearby restaurants serving that type of food.

Figure 10:
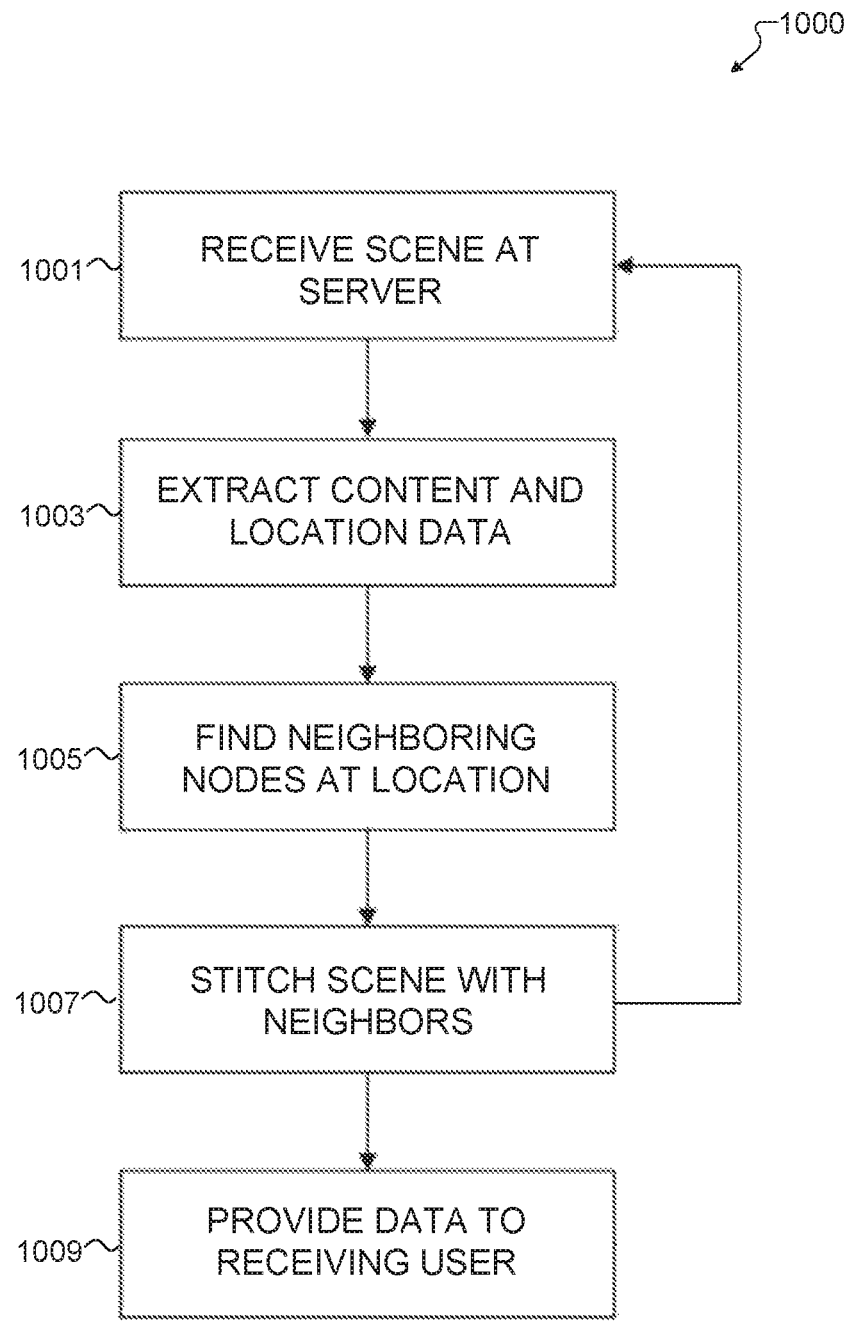
FIG. 10 illustrates an example process for global scene stitching in accordance with this disclosure.

FIG. 10 illustrates an example process 1000 for global scene stitching in accordance with this disclosure. The process 1000 can be used during scene reconstruction to check for new content when an augmented reality scene has changed. For ease of explanation, the process 1000 may be described as being performed within the network configuration 100 shown in FIG. 1. In particular, the process 1000 may be performed by the server 106 as part of the method 450 of FIG. 4B, e.g., in conjunction with step 453. However, in other embodiments where a server is not required (e.g., a peer-to-peer network), the process 1000 can be performed by an electronic device 101 that recreates the scene. In general, the process 1000 can be performed by an suitable device that has sufficient processing power. In addition, the process 1000 may be performed in any suitable environment.

At step 1001, the server 106 receives a scene that is part of an augmented reality scene. For example, if a receiving user that is viewing an augmented reality scene walks to new location within the scene or adjacent to the scene, the new location might be associated with other virtual objects. Content and location data from the receiving user's electronic device 101 can be sent to the server 106 to find new data to resolve.

At step 1003, the server 106 extracts the content and location data sent by the receiving user's electronic device 101. At step 1005, the server 106 finds neighboring nodes at that location. In some embodiments, the server 106 stores or accesses a map of scenes in the real world. The map allows free placement and storage of data objects at any location. In some embodiments, the server 106 may include a system of registering geographical locations and assigning owners, to control customization in specific areas and enable scene curation. Further, additional services may include carving out distinct locations, or can leverage existing location maps.

In some embodiments, the map of scenes can be based on a point cloud model. Point clouds from multiple augmented reality scenes located adjacent each other or geographically near each other can be joined together into a continuous global point cloud. Overlapping parts of adjacent point clouds may be matched using a point set registration algorithm to find one-to-one matches between points in the overlapping sections. The global point cloud may be maintained at the server 106, or may be maintained elsewhere but simply accessed by the server 106. In some embodiments, the global point cloud can be split into large areas to avoid coordinate numeric overflow. Each section can maintain original metadata to allow localization within the global point cloud.

At step 1007, the server 106 identifies scene data from the neighboring nodes using the global point cloud. If there are additional neighboring nodes that can be stitched together, then the server 106 can repeat steps 1001-1007 for each neighboring node.

In some embodiments, objects in an augmented reality scene are attached to an anchor point object that tracks a fixed point in the real world. These objects hold a pose object that track the position and translation of the fixed point from the origin of the coordinate system, which is initialized at the beginning of the session, to an arbitrary point in space. In some embodiments, the pose object may be a matrix as exemplified in the 4 by 4 matrix below.

$$P = \begin{bmatrix} R_{00} & R_{01} & R_{02} & T_x \\ R_{10} & R_{11} & R_{12} & T_y \\ R_{20} & R_{21} & R_{22} & T_z \\ 0 & 0 & 0 & 1 \end{bmatrix}$$

where $R \in \mathbb{R}^{3 \times 3}$ is an orthogonal rotational matrix and $T \in \mathbb{R}^3$ represents a translation from the origin.

Any position in world coordinates w=[x, y, z] can have the same transform applied by appending a 1 to the end to make a length 4 vector and left multiplying P. Additionally, the AR's world coordinates can be set to have $+\hat{y}$ directed against the gravity vector, so a vertical vector may be available through they component of the anchor pose.

At this point, two or more scenes from neighboring nodes have been stitched together into one global scene. In some embodiments, the global scene can optionally be provided to another device for viewing. For example, at step 1009, the server 106 can optionally provide the scene data to the electronic device 101 of the receiving user for showing the augmented scene in the new location. Thus, at the electronic device 101, only the local surrounding section of point cloud data needs to be loaded at any given moment.

The embodiments described above advantageously provide systems and methods for generating, customizing, and viewing augmented reality scenes. As discussed above, the disclosed embodiments can be used to share humor or entertainment between friends or family members. In addition, the disclosed embodiments can be used in instructional situations, where virtual objects provide descriptive or instructional information of real world objects. For example, in a hotel room or short-term rental, virtual labels could appear over real world objects to show a guest where a first-aid kit is located, or how to operate a coffee maker. As another example, virtual labels in a home could instruct a cleaning person to perform certain tasks (such as empty trash or reorganize a cabinet). The disclosed embodiments can be used in conjunction with Internet-Of-Things (TOT) devices or other smart devices. For example, virtual objects could be included in an AR scene to operate as virtual switches for smart devices that are connected to the electronic device showing the AR scene.

The embodiments described above are not meant to be limiting and are merely illustrative of various aspects of this disclosure. While example embodiments may be indicated as applicable to a particular device category (such as mobile devices, servers, etc.), the processes and examples provided above are not intended to be solely limited to those device categories and can be broadly applicable to various device categories (such as appliances, computers, automobiles, smart speakers, IoT devices, etc.).

While the figures have been described and novel features as applied to various embodiments have been pointed out above, it will be understood that various omissions, substitutions, and changes in the form and details of the systems, devices, or processes described above may be made by those skilled in the art without departing from the scope of this disclosure. This description is in no way meant to be limiting but rather should be taken as illustrative of the general principles of this disclosure.

Although this disclosure has been described with reference to various example embodiments, various changes and modifications may be suggested to one skilled in the art. It is intended that this disclosure encompass such changes and modifications as fall within the scope of the appended claims.

What is claimed is:

1. An electronic device comprising:
   an image sensor;
   a touchscreen display;
   a transceiver;
   a processor coupled to the image sensor, the touchscreen display, and the transceiver; and
   a memory coupled to the processor, the memory storing instructions executable by the processor to:
      receive images of a real world environment via the image sensor;
      generate an augmented reality scene based on the received images, the augmented reality scene including one or more virtual objects previously saved to the augmented reality scene by a user;
      examine at least one of the one or more virtual objects previously saved to the augmented reality scene;
      determine a user interest associated with the user based at least in part on the at least one examined virtual object that was previously saved to the augmented reality scene;
      receive, via the touchscreen display, a user input setting a location of at least one augmented reality anchor point on the received images of the real world environment;
      output multiple candidate virtual objects associated with the determined user interest to the touchscreen display;
      receive a user selection of at least one virtual object, from among the multiple candidate virtual objects, to be associated with the at least one augmented reality anchor point;
      output to the touchscreen display the at least one virtual object in proximity to the at least one augmented reality anchor point;
      update the augmented reality scene based at least in part on the at least one augmented reality anchor point and the at least one virtual object; and
      transmit the updated augmented reality scene to a receiving device via the transceiver.

2. The electronic device of claim 1, wherein the memory further stores instructions executable by the processor to:
   output to the touchscreen display a user interface containing one or more controls to customize an appearance of the at least one virtual object;
   receive a user selection of a first control of the one or more controls; and
   adjust at least one of a position, a scale, or an orientation of the at least one virtual object based at least in part on the user selection of the first control.

3. The electronic device of claim 1, wherein the instructions to output to the touchscreen display the at least one virtual object in proximity to the at least one augmented reality anchor point comprise instructions to:
   determine a bounding box of the at least one virtual object;
   sample, in a radial manner starting at the location of the at least one augmented reality anchor point, possible locations of the bounding box;
   for each possible location of the bounding box, determine whether a second bounding box associated with an existing virtual object intersects with the possible location;
   when no second bounding box associated with an existing virtual object intersects with the possible location, select the possible location as a display location for the at least one virtual object; and
   control the touchscreen display to show the at least one virtual object at the display location.

4. The electronic device of claim 1, wherein the instructions to output to the touchscreen display the at least one virtual object in proximity to the at least one augmented reality anchor point comprise instructions to:
   determine a category of at least one real world object visible in the received images of the real world environment;
   determine an association between a category of the at least one virtual object and the category of the at least one real world object;
   select a display location for the at least one virtual object that is in proximity to the at least one real world object based on the association; and
   control the touchscreen display to show the at least one virtual object at the display location.

5. The electronic device of claim 4, wherein the memory further stores instructions executable by the processor to:
   determine an initial display size for the at least one virtual object based at least in part on dimensions of the at least one real world object.

6. The electronic device of claim 1, wherein the augmented reality scene comprises location information indicating a location of the real world environment, the location information configured to allow a second device to retrieve the augmented reality scene when the second device is at the location.

7. The electronic device of claim 1, wherein the location of the at least one augmented reality anchor point corresponds to at least one physical object of the real world environment.

8. The electronic device of claim 1, wherein the user interest is determined using tags of the at least one examined virtual object.

9. A method comprising:
   receiving, from an image sensor, images of a real world environment;
   generating an augmented reality scene based on the received images, the augmented reality scene including one or more virtual objects previously saved to the augmented reality scene by a user;
   examining at least one of the one or more virtual objects previously saved to the augmented reality scene;
   determining a user interest associated with the user based at least in part on the at least one examined virtual object that was previously saved to the augmented reality scene;
   receiving, from a touchscreen display, a user input setting a location of at least one augmented reality anchor point on the received images of the real world environment;
   displaying multiple candidate virtual objects associated with the determined user interest at the touchscreen display;
   receiving a user selection of at least one virtual object, from among the multiple candidate virtual objects, to be associated with the at least one augmented reality anchor point;
   displaying, at the touchscreen display, the at least one virtual object in proximity to the at least one augmented reality anchor point;

updating the augmented reality scene based at least in part on the at least one augmented reality anchor point and the at least one virtual object; and transmitting the updated augmented reality scene to a receiving device.

10. The method of claim 9, further comprising:

displaying, at the touchscreen display, a user interface containing one or more controls to customize an appearance of the at least one virtual object;

receiving a user selection of a first control of the one or more controls; and adjusting at least one of a position, a scale, or an orientation of the at least one virtual object based at least in part on the user selection of the first control.

11. The method of claim 9, wherein displaying, at the touchscreen display, the at least one virtual object in proximity to the at least one augmented reality anchor point comprises:

determining a bounding box of the at least one virtual object;

sampling, in a radial manner starting at the location of the at least one augmented reality anchor point, possible locations of the bounding box;

for each possible location of the bounding box, determining whether a second bounding box associated with an existing virtual object intersects with the possible location;

when no second bounding box associated with an existing virtual object intersects with the possible location, selecting the possible location as a display location for the at least one virtual object; and displaying, at the touchscreen display, the at least one virtual object at the display location.

12. The method of claim 9, wherein displaying, at the touchscreen display, the at least one virtual object in proximity to the at least one augmented reality anchor point comprises:

determining a category of at least one real world object visible in the received images of the real world environment;

determining an association between a category of the at least one virtual object and the category of the at least one real world object;

selecting a display location for the at least one virtual object that is in proximity to the at least one real world object based on the association; and displaying, at the touchscreen display, the at least one virtual object at the display location.

13. The method of claim 12, further comprising:

determining an initial display size for the at least one virtual object based at least in part on dimensions of the at least one real world object.

14. The method of claim 9, wherein the augmented reality scene comprises location information indicating a location of the real world environment, the location information configured to allow a second device to retrieve the augmented reality scene when the second device is at the location.

15. The method of claim 9, the location of the at least one augmented reality anchor point corresponds to at least one physical object of the real world environment.

16. The method of claim 9, wherein the user interest is determined using tags of the at least one examined virtual object.

17. An electronic device comprising:

a transceiver;

a processor coupled to the transceiver; and a memory coupled to the processor, the memory storing instructions executable by the processor to:

store multiple augmented reality scenes received from a first device, each augmented reality scene comprising at least one virtual object and at least one physical object disposed in a location of a real world environment, the at least one virtual object added to the augmented reality scene while the first device is at or near the location;

receive, via the transceiver, an indication that a second device is at or near the location after the first device has left the location;

in response to receiving the indication that the second device is at or near the location:

determine a list of augmented reality scenes that are associated with the location and are among the stored augmented reality scenes received from the first device, the list including a first augmented reality scene and a second augmented reality scene; and transmit, via the transceiver, a textual notification comprising the list of augmented reality scenes to the second device for presentation on a display of the second device;

receive, via the transceiver, a first request from the second device to send the first augmented reality scene to the second device, the first augmented reality scene having a first point cloud, wherein the first augmented reality scene is selected by a user after the textual notification comprising the list of augmented reality scenes is presented at the second device;

transmit, via the transceiver, the first augmented reality scene to the second device for showing the first augmented reality scene on the display of the second device, the first augmented reality scene further comprising a thumbnail image to be shown in a camera view of the second device, the thumbnail image configured to guide the user to the location;

receive, via the transceiver, a second request from the second device to send the second augmented reality scene to the second device, the second augmented reality scene having a second point cloud that overlaps the first point cloud;

stitch together the first augmented reality scene and the second augmented reality scene into a global scene based on the overlapping first point cloud and second point cloud; and transmit, via the transceiver, the second augmented reality scene to the second device for showing the global scene on the display of the second device.

18. The electronic device of claim 17, wherein the first and second augmented reality scenes comprise location information indicating the location of the real world environment.

19. The electronic device of claim 18, wherein the instructions to stitch together the first augmented reality scene and the second augmented reality scene into the global scene comprise instructions to:

use a point set registration algorithm to find one-to-one matches between points in overlapping parts of the first point cloud and the second point cloud.

20. The electronic device of claim 19, wherein the instructions to stitch together the first augmented reality scene and the second augmented reality scene into the global scene further comprise instructions to:
- extract content and location data received from the second device; and
- identify neighboring nodes at the location of the second device.

* * * * *